(12) United States Patent
Kurokawa

(10) Patent No.: US 12,556,197 B2
(45) Date of Patent: Feb. 17, 2026

(54) SUCCESSIVE APPROXIMATION TYPE A/D CONVERSION CIRCUIT

(71) Applicant: ROHM CO., LTD., Kyoto (JP)

(72) Inventor: Ryoichi Kurokawa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 153 days.

(21) Appl. No.: 18/523,559

(22) Filed: Nov. 29, 2023

(65) Prior Publication Data

US 2024/0187017 A1    Jun. 6, 2024

(30) Foreign Application Priority Data

Dec. 1, 2022  (JP) .................................. 2022-193042

(51) Int. Cl.
H03M 1/38    (2006.01)
H03M 1/46    (2006.01)

(52) U.S. Cl.
CPC .................................. H03M 1/466 (2013.01)

(58) Field of Classification Search
CPC ...... H03M 1/1245; H03M 1/466; H03M 1/66; H03M 1/38
USPC .......................... 341/155, 172, 144, 143, 161
See application file for complete search history.

(56) References Cited

U.S. PATENT DOCUMENTS

2015/0109159 A1* 4/2015 Liu ........................ H03M 1/005
341/143

FOREIGN PATENT DOCUMENTS

JP        2019-080292        5/2019

* cited by examiner

*Primary Examiner* — Peguy Jean Pierre
(74) *Attorney, Agent, or Firm* — Fish & Richardson P.C.

(57) ABSTRACT

A successive approximation type A/D conversion circuit includes a capacitor type DAC and configured to convert an analog input signal into a digital output signal, and the capacitor type DAC includes a capacitor array including a plurality of capacitors, and a switch array configured to selectively apply a first reference voltage, a second reference voltage higher than the first reference voltage, or the analog input signal individually to a first end of each of the plurality of capacitors, one or more capacitors among the plurality of capacitors belonging to a first type capacitor, the other capacitors among the plurality of capacitors belonging to a second type capacitor, a second end of the first type capacitor being connected to a first signal wiring, and a second end of the second type capacitor being connected to a second signal wiring.

7 Claims, 27 Drawing Sheets

[First connection configuration]

[Fourth connection configuration]

AD conversion operation

[Sampling operation (sampling period)]

[State transition operation]

Lower side ←⎯⎯⎯  ⎯⎯⎯→ Upper side

[Successive approximation operation (successive approximation period)]

At the time of sampling

At the time of successive approximation

FIG. 27
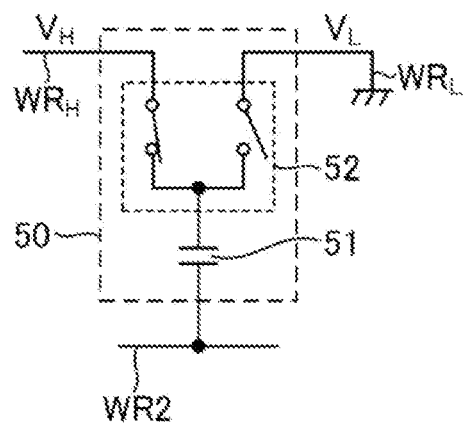
Sampling period
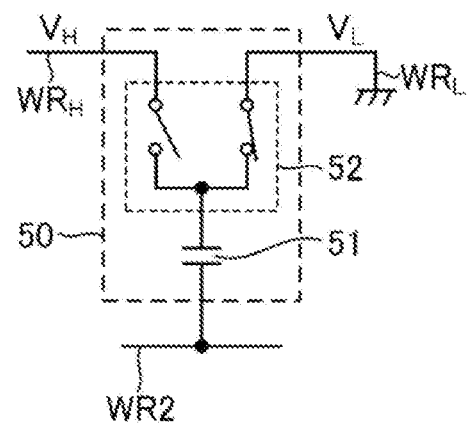
Successive approximation period

SUCCESSIVE APPROXIMATION TYPE A/D CONVERSION CIRCUIT

CROSS-REFERENCE TO RELATED APPLICATION

This application is based upon and claims the benefit of priority from Japanese Patent Application No. 2022-193042, filed on Dec. 1, 2022, the entire contents of which are incorporated herein by reference.

TECHNICAL FIELD

The present disclosure relates to a successive approximation type A/D (analog-to-digital) conversion circuit.

BACKGROUND

A successive approximation type A/D conversion circuit generally includes a DAC (Digital-to-Analog Converter), a comparator, and a logic circuit (control circuit) responsible for successive approximation. A capacitor type DAC (capacitive DAC) is often used as the DAC.

BRIEF DESCRIPTION OF DRAWINGS

The accompanying drawings, which are incorporated in and constitute a part of the specification, illustrate embodiments of the present disclosure.

FIG. 27 is a state transition diagram of a voltage step-down circuit, according to the second example belonging to the embodiment of the present disclosure.

DETAILED DESCRIPTION

Figure 1:
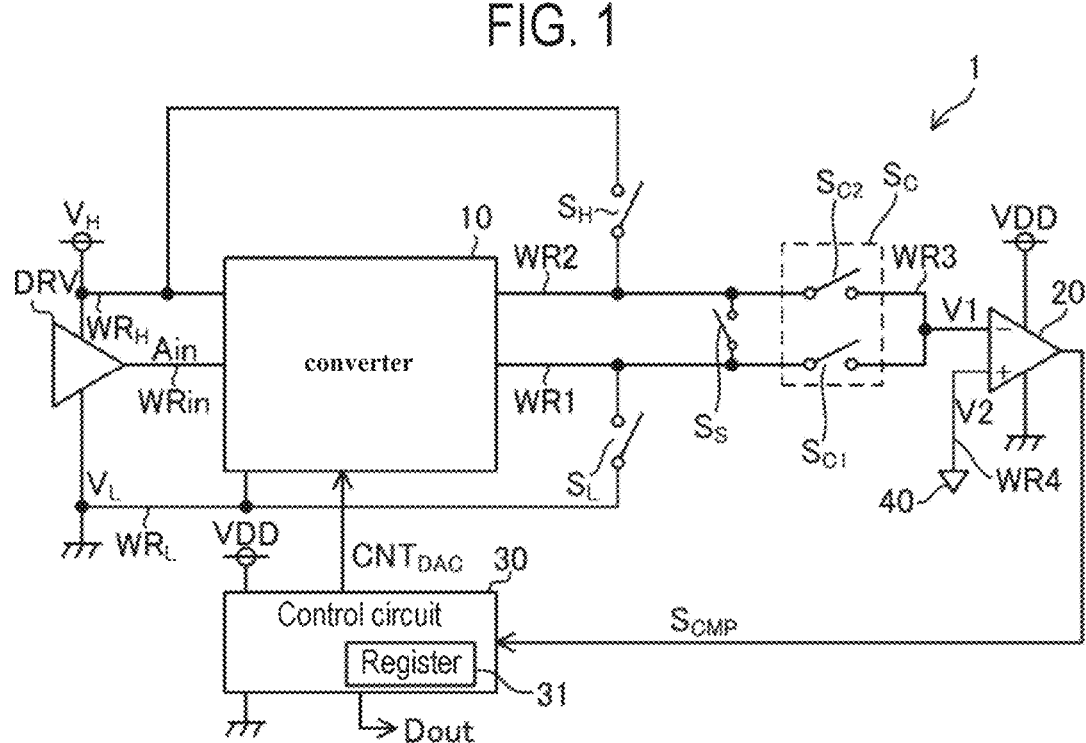
FIG. 1 is an overall configuration diagram of an A/D converter according to an embodiment of the present disclosure.

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Examples of embodiments of the present disclosure will be specifically described below with reference to the drawings. Throughout the referred drawings, the same parts are denoted by the same reference numerals, and duplicate explanation thereof will be omitted in principle. In the present disclosure, for the sake of simplification of description, by describing a symbol or code that refers to information, a signal, a physical quantity, a functional part, a circuit, an element, a part, etc., the information, the signal, the physical quantity, the functional part, the circuit, the element, the part, etc., corresponding to the symbol or the code may be omitted or abbreviated.

First, some terms used in the description of the embodiments of the present disclosure will be explained. Any switch can be composed of one or more FETs (Field Effect Transistors), and when a certain switch is in an on state, conduction occurs between both ends of the switch, while when a certain switch is in an off state, no conduction occurs between both ends of the switch. Any switch may be an analog switch. Hereinafter, the on state and off state of any switch may be simply expressed as on and off. A connection between a plurality of parts forming a circuit, such as arbitrary circuit elements, wirings, and nodes, may be understood to refer to an electrical connection, unless otherwise specified.

FIG. 1 shows an overall configuration diagram of an A/D converter 1 according to an embodiment of the present disclosure. The A/D converter 1 is a successive approximation type A/D conversion circuit. A driver DRV is connected to the A/D converter 1. The driver DRV is a signal supply circuit that supplies an analog input signal Ain to the A/D converter 1. The analog input signal Ain from the driver DRV is input to the A/D converter 1. The A/D converter 1 performs an A/D conversion operation for the analog input signal Ain. In the A/D conversion operation for the analog input signal Ain, the analog input signal Ain is converted into a digital signal by binary search, and an obtained digital signal is output as a digital output signal Dout.

The digital output signal Dout is an N-bit digital signal. For example, the digital output signal Dout has a total of N bits from a first bit to an N-th bit. N is any integer of 2 or more, for example, 8, 10, 12, 14, or 16. Here, it is assumed that an (i+1)-th bit is an upper bit when viewed from an i-th bit. Therefore, among the first to N-th bits, the first bit is the least significant bit, and the N-th bit is the most significant bit. i represents any integer and may be understood to represent a natural number of N or less.

The A/D converter 1 includes a converter 10, a comparator 20, a control circuit 30, a voltage generation circuit 40, and switches $S_H$, $S_L$, $S_C$, and $S_S$. A wiring WRin is an analog input wiring to which the analog input signal Ain is applied. A predetermined voltage $V_H$ is applied to a wiring $WR_H$. A predetermined voltage $V_L$ is applied to a wiring $WR_L$. Both voltages $V_H$ and $V_L$ are DC (direct current) voltages. The voltage $V_H$ may be higher than the voltage $V_L$. The voltages $V_H$ and $V_L$ correspond to reference voltages in the A/D converter 1. The voltage $V_H$ corresponds to a high-side reference voltage (high-potential side reference voltage), and the voltage $V_L$ corresponds to a low-side reference voltage (low-potential side reference voltage). Therefore, the wiring $WR_H$ corresponds to a high-side reference wiring, and the wiring $WR_L$ corresponds to a low-side reference wiring. The voltage $V_H$ has a positive DC voltage value (e.g., 5 V). Here, it is assumed that the voltage $V_L$ is a ground voltage. In this embodiment, hereinafter, unless otherwise specified, the voltage $V_L$ and the ground voltage refer to the same thing.

The ground refers to a reference conductive part having a reference potential of 0 V (zero volts), or refers to a 0 V potential itself. The reference conductive part may be formed using a conductor such as metal. The wiring $WR_L$ is a ground wiring to which the ground voltage is applied. It may be understood that the wiring $WR_L$ itself is the ground. The ground voltage has the ground potential and is therefore 0 V.

The driver DRV is connected to the wiring WRin and outputs the analog input signal Ain to the wiring WRin. The driver DRV is connected to the wirings $WR_H$ and $WR_L$. The driver DRV is driven using the voltage $V_H$ as a drive voltage based on the potential of the voltage $V_L$. Therefore, the analog input signal Ain has a voltage value higher than or equal to the voltage $V_L$ and lower than or equal to the voltage $V_H$. The wirings WRin, $WR_H$, and $WR_L$ are connected to the converter 10.

Figure 2:
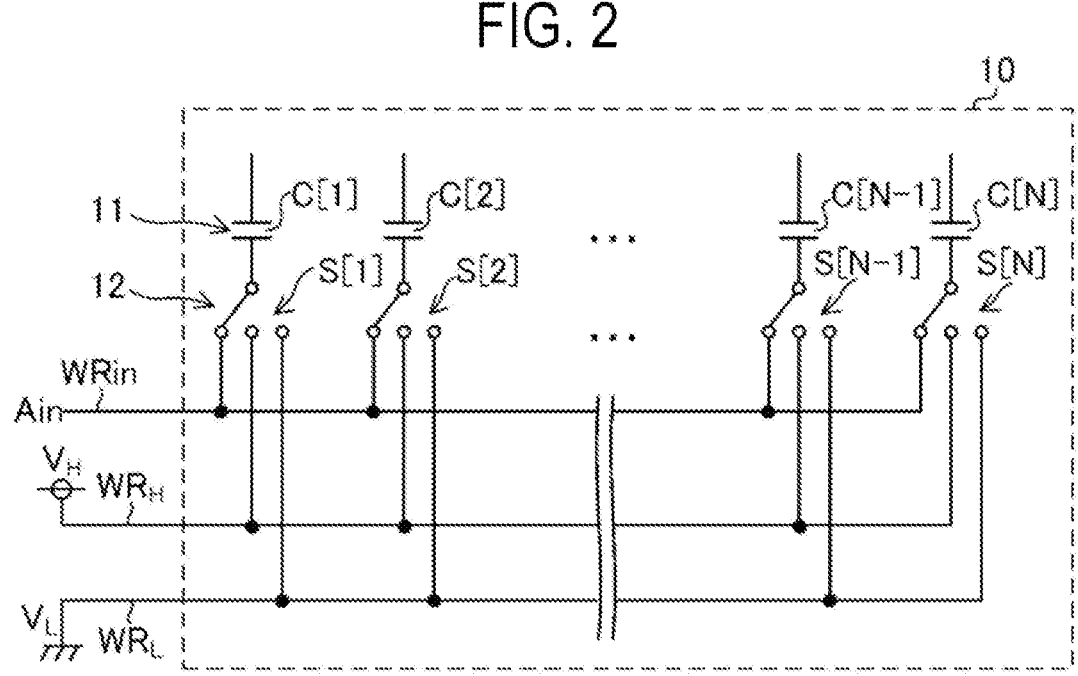
FIG. 2 is an internal configuration diagram of a DAC according to an embodiment of the present disclosure.

FIG. 2 shows an internal configuration of the converter 10. The converter 10 is a capacitor type DAC (capacitor type digital-to-analog converter). The capacitor type DAC is also generally referred to as a capacitive converter or just converter. The converter 10 includes a capacitor array 11 and a switch array 12. The capacitor array 11 includes capacitors C[1] to C[N], and the switch array 12 includes switches S[1] to S[N].

Each of the capacitors C[1] to C[N] has a first end and a second end, and charges are accumulated between the first end and the second end. The switches S[1] to S[N] are provided to correspond to the capacitors C[1] to C[N], respectively. That is, a switch S[i] is provided to correspond to a capacitor C[i]. Further, the capacitor C[i] corresponds to the i-th bit in the digital output signal Dout. One of the first and second ends of the capacitor C[i] is called a switch end, and the other is referred to as a signal wiring end. The switch end of the capacitor C[i] is connected to the switch S[i]. The signal wiring end of the capacitor C[i] is connected to a signal wiring WR1 or WR2. However, FIG. 2 does not illustrate how each signal wiring end of the capacitors C[1] to C[N] is connected to the signal wiring WR1 or WR2. The analog input signal Ain and the voltage $V_H$ or voltage $V_L$ can be applied to the switch ends of the capacitors C[1] to C[N] via the switches S[1] to C[N].

Figure 3:
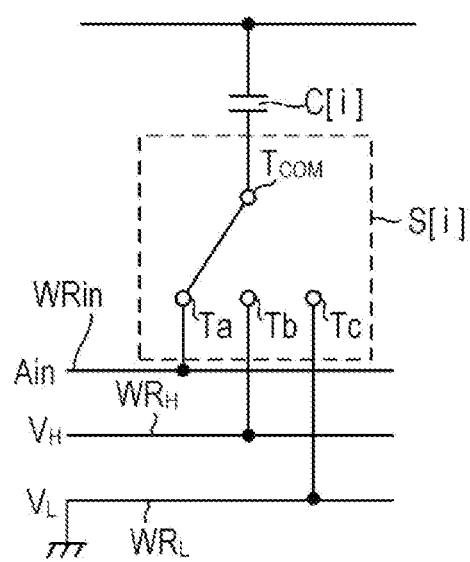
FIG. 3 is a diagram showing an internal configuration and peripheral circuits of one switch in a switch array, according to an embodiment of the present disclosure.

FIG. 3 shows a connection relationship between the capacitor C[i], the switch S[i], and the wirings WRin, $WR_H$, and $WR_L$. The switches S[1] to S[N] each include a common terminal $T_{COM}$ and switching terminals Ta, Tb, and Tc. The common terminals $T_{COM}$ of the switches S[1] to S[N] are connected to the switch ends of the capacitors C[1] to C[N], respectively. That is, for example, the common terminal $T_{COM}$ of the switch S[1] is connected to the switch end of the capacitor C[1], and the common terminal $T_{COM}$ of the switch S[2] is connected to the switch end of the capacitor C[2]. The same applies to the switch S[3] and the like. Each switching terminal Ta of the switches S[1] to S[N] is connected to the wiring WRin and receives the analog input signal Ain. Each switching terminal Tb of the switches S[1] to S[N] is connected to the wiring $WR_H$, and the voltage $V_H$ is applied to each switching terminal Tb. Each switching terminal Tc of the switches S[1] to S[N] is connected to the wiring $WR_L$, and the voltage $V_L$ is applied to each switching terminal Tc.

Under the control of the control circuit 30, in each of the switches S[1] to S[N], the common terminal $T_{COM}$ is selectively connected to any one of the switching terminals Ta, Tb, and Tc. However, in the switch S[i], the common terminal $T_{COM}$ may not be connected to any of the switching terminals Ta, Tb, and Tc.

Figure 4:
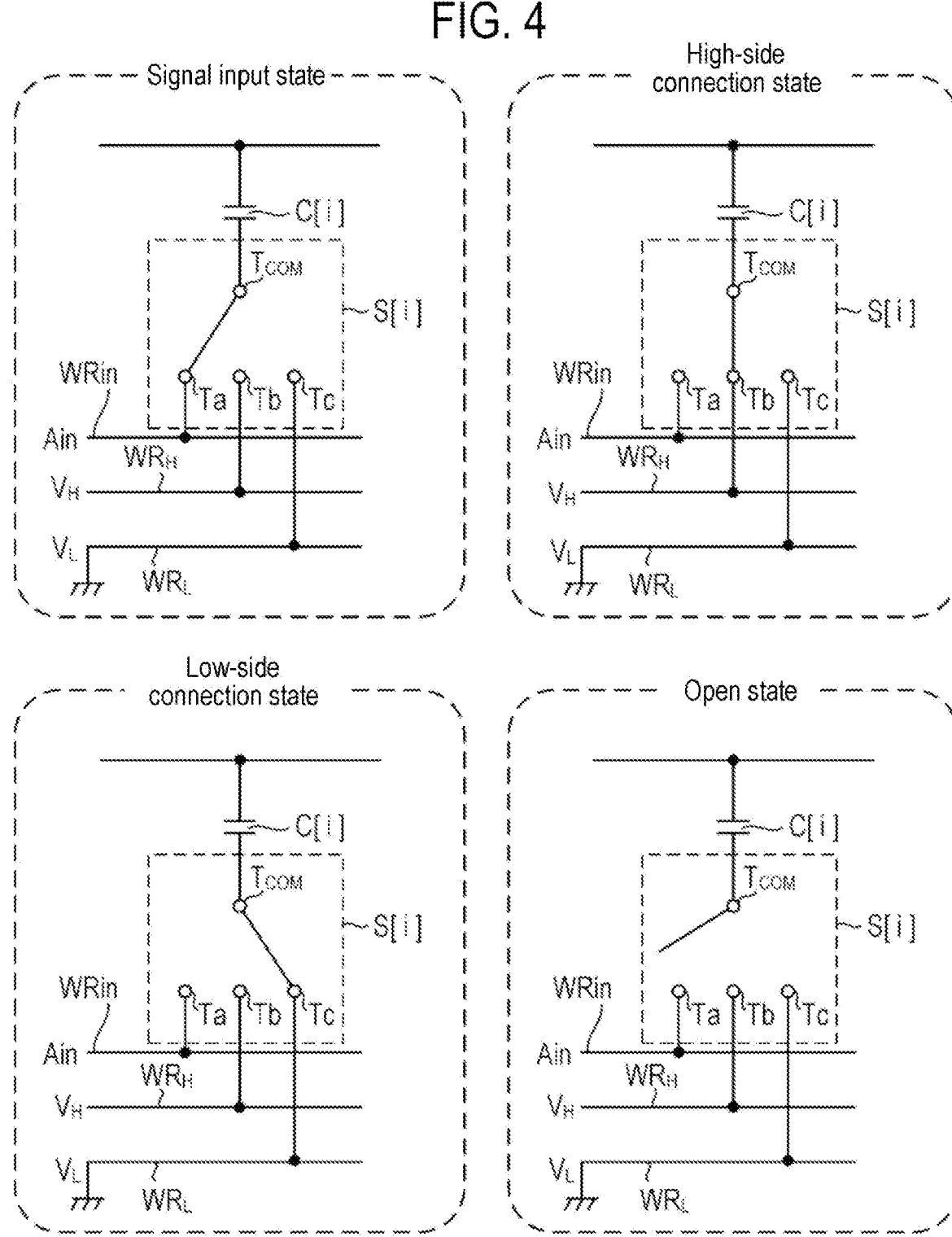
FIG. 4 is a diagram showing four states of one switch in the switch array, according to an embodiment of the present disclosure.

Referring to FIG. 4, in any switch S[i], the states in which the common terminal $T_{COM}$ is connected to the switching terminals Ta, Tb, and Tc are referred to as a signal input state, a high-side connection state, and a low-side connection state, respectively, and the state in which the common terminal $T_{COM}$ is not connected to any of the switching terminals Ta, Tb, and Tc is referred to as an open state. In the signal input state, the high-side connection state, and the low-side connection state of the switch S[i], the analog input signal Ain, the voltage $V_H$, and the voltage $V_L$ are applied to the switch end of the capacitor C[i], respectively. FIG. 2 shows, as an example, a state in which the switches S[1] to S[N] are all in the signal input state. The switches S[1] to [N] may be multiplexers.

FIG. 1 is referenced again. The switch $S_L$ is a low-side switch provided between the signal wiring WR1 and the wiring $WR_L$. Specifically, a first end of the switch $S_L$ is connected to the signal wiring WR1, a second end of the switch $S_L$ is connected to the wiring $WR_L$, and the voltage $V_L$ (here, the ground voltage) is applied to the second end of the switch $S_L$. The switch $S_H$ is a high-side switch provided between the signal wiring WR2 and the wiring $WR_H$. Specifically, a first end of the switch $S_H$ is connected to the signal wiring WR2, a second end of the switch $S_H$ is connected to the wiring $WR_H$, and the voltage $V_H$ is applied to the first end of the switch $S_H$.

When the switch $S_L$ is on, the first end and the second end of the switch $S_L$ are electrically connected to fix the voltage of the signal wiring WR1 to the voltage $V_L$. When the switch $S_L$ is off, the first end and the second end of the switch $S_L$ are cut off (electrically disconnected). When the switch $S_H$ is on, the first end and the second end of the switch $S_H$ are electrically connected to fix the voltage of the signal wiring WR2 to the voltage $V_H$. When the switch $S_H$ is off, the first end and the second end of the switch $S_H$ are cut off (electrically disconnected). FIG. 1 shows, as an example, a state in which the switches $S_L$ and $S_H$ are off.

The switch $S_C$ is a connection switch for connecting the signal wirings WR1 and WR2 to a signal wiring WR3. The switch $S_C$ includes a switch $S_{C1}$ provided between the signal wirings WR1 and WR3, and a switch $S_{C2}$ provided between the signal wirings WR2 and WR3. A first end of the switch $S_{C1}$ is connected to the signal wiring WR1, and a second end of the switch $S_{C1}$ is connected to the signal wiring WR3. Therefore, when the switch $S_{C1}$ is on, the signal wirings WR1 and WR3 are electrically connected through the switch Sci. A first end of the switch $S_{C2}$ is connected to the signal wiring WR2, and a second end of the switch $S_{C2}$ is connected to the signal wiring WR3. Therefore, when the switch $S_{C2}$ is on, the signal wirings WR2 and WR3 are electrically connected through the switch $S_{C2}$. FIG. 1 shows, as an example, a state in which the switches $S_{C1}$ and $S_{C2}$ are off.

The switch $S_S$ is a short-circuit switch for directly short-circuiting between the signal wirings WR1 and WR2 without going through the signal wiring WR3. A first end of the switch $S_S$ is connected to the signal wiring WR1, and a second end of the switch $S_S$ is connected to the signal wiring WR2. Therefore, when the switch $S_S$ is on, the signal wirings WR1 and WR2 are electrically connected (short-circuited) through the switch $S_S$ without going through the signal wiring WR3. FIG. 1 shows, as an example, a state in which the switch $S_S$ is off.

The switches $S_L$, $S_H$, $S_{C1}$, $S_{C2}$, and $S_S$ are individually controlled to be on or off by the control circuit 30. For an arbitrary switch, controlling a switch to a certain target state by the control circuit 30 may be equivalent to setting the state of the switch to the target state by the control circuit 30.

The comparator 20 and the control circuit 30 are driven based on a predetermined power supply voltage VDD with respect to the ground voltage as a reference. The power supply voltage VDD is a positive DC voltage. The voltage $V_H$ may be the power supply voltage VDD, or a DC voltage different from the voltage $V_H$ may be the power supply voltage VDD.

The comparator 20 is connected to the signal wirings WR3 and WR4. A voltage applied to the signal wiring WR3 is referred to as a comparison voltage V1, and a voltage applied to the signal wiring WR4 is referred to as a comparison voltage V2. The comparator 20 compares the comparison voltages V1 and V2 and generates and outputs a comparison result signal $S_{CMP}$ indicating the comparison result (level relationship) of the comparison voltages V1 and V2. The comparison result signal $S_{CMP}$ is a binary signal having a value of "0" or "1." The comparator 20 has a non-inverting input terminal, an inverting input terminal, and an output terminal. Here, it is assumed that the inverting input terminal of the comparator 20 is connected to the signal wiring WR3, and the non-inverting input terminal thereof is connected to the signal wiring WR4 (however, the connection relationship may be reversed).

The comparator 20 outputs the comparison result signal $S_{CMP}$ having the value of "1" from its own output terminal when "V1<V2" is established, and outputs the comparison result signal $S_{CMP}$ having the value of "0" from its own output terminal when "V1>V2" is established. When "V1=V2" is established, the comparison result signal $S_{CMP}$ has the value of "0" or "1." "V1>V2" represents that the comparison voltage V1 is higher than the comparison voltage V2, and "V1<V2" represents that the comparison voltage V1 is lower than the comparison voltage V2. The same applies to other expressions including physical quantities such as a voltage.

The control circuit 30 receives the comparison result signal $S_{CMP}$. The control circuit 30 controls the entire A/D conversion operation and outputs the digital output signal Dout obtained by the A/D conversion operation. The control circuit 30 is provided with a register 31, and a value of the digital output signal Dout can be stored in the register 31. The control circuit 30 individually controls the states of the switches S[1] to S[N] by supplying a control signal $CNT_{DAC}$ (converter input signal) to the converter 10. Further, the control circuit 30 individually controls the states of the switches $S_L$, $S_H$, $S_{C1}$, $S_{C2}$, and $S_S$ by supplying a control signal (not shown) to the switches $S_L$, $S_H$, $S_{C1}$, $S_{C2}$, and $S_S$.

The voltage generation circuit 40 generates the comparison voltage V2 to be compared with the comparison voltage V1 and supplies the generated comparison voltage V2 to the signal wiring WR4.

Figure 5:
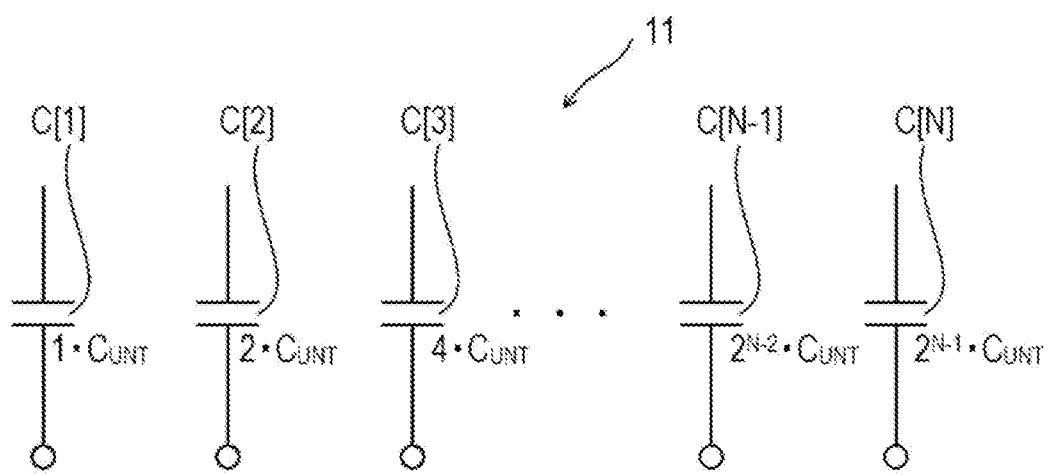
FIG. 5 is a diagram showing a relationship between capacitance values of a plurality of capacitors in a capacitor array, according to an embodiment of the present disclosure.

In the converter 10, for any integer i, the capacitance value of a capacitor C[i+1] is larger than the capacitance value of the capacitor C[i]. Here, as shown in FIG. 5, it is assumed that the capacitor C[i] in the converter 10 has a capacitance value of "$2^{i-1} \cdot C_{UNT}$." Therefore, in the converter 10, for any integer i, the capacitance value of the capacitor C[i+1] is twice the capacitance value of the capacitor C[i]. COUNT represents a predetermined unit capacitance value.

Figure 6:
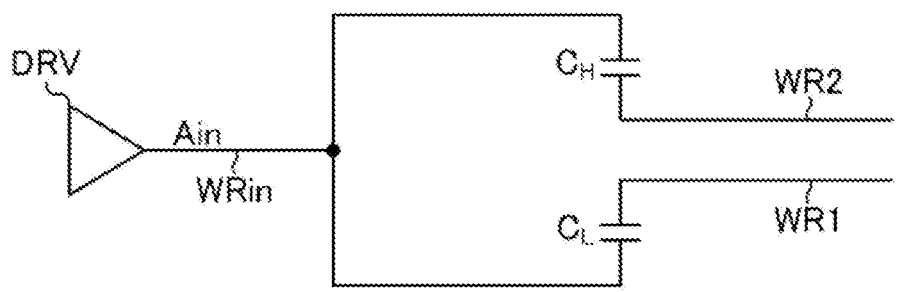
FIG. 6 is an equivalent circuit diagram of a DAC when each switch constituting a switch array is in a signal input state, according to an embodiment of the present disclosure.

FIG. 6 shows an equivalent circuit of the converter 10 when the switches S[1] to [N] are all in the signal input state. In FIG. 6, a capacitor $C_L$ is a combined capacitance of all capacitors connected to the signal wiring WR1 among the capacitors C[1] to C[N]. In FIG. 6, a capacitor $C_H$ is a combined capacitance of all capacitors connected to the signal wiring WR2 among the capacitors C[1] to C[N]

Among the capacitors C[1] to C[N], a capacitor connected to the signal wiring WR1 is referred to as a first type capacitor for the sake of convenience, and a capacitor connected to the signal wiring WR2 is referred to as a second type capacitor for the sake of convenience. Therefore, when the capacitor C[i] is the first type capacitor, the signal wiring end of the capacitor C[i] is connected to the signal wiring WR1, and when the capacitor C[i] is the second type capacitor, the signal wiring end of the capacitor C[i] is connected to the signal wiring WR2. In the converter 10, some of the capacitors C[1] to C[N] belong to the first type capacitor, and the others of the capacitors C[1] to C[N] belong to the second type capacitor. Among the capacitors C[1] to C[N], the number of capacitors belonging to the first type capacitor is arbitrary as long as it is 1 or more, and the number of capacitors belonging to the second type capacitor is arbitrary as long as it is 1 or more. However, each of the capacitors C[1] to C[N] belongs to either the first type capacitor or the second type capacitor.

Figure 7:
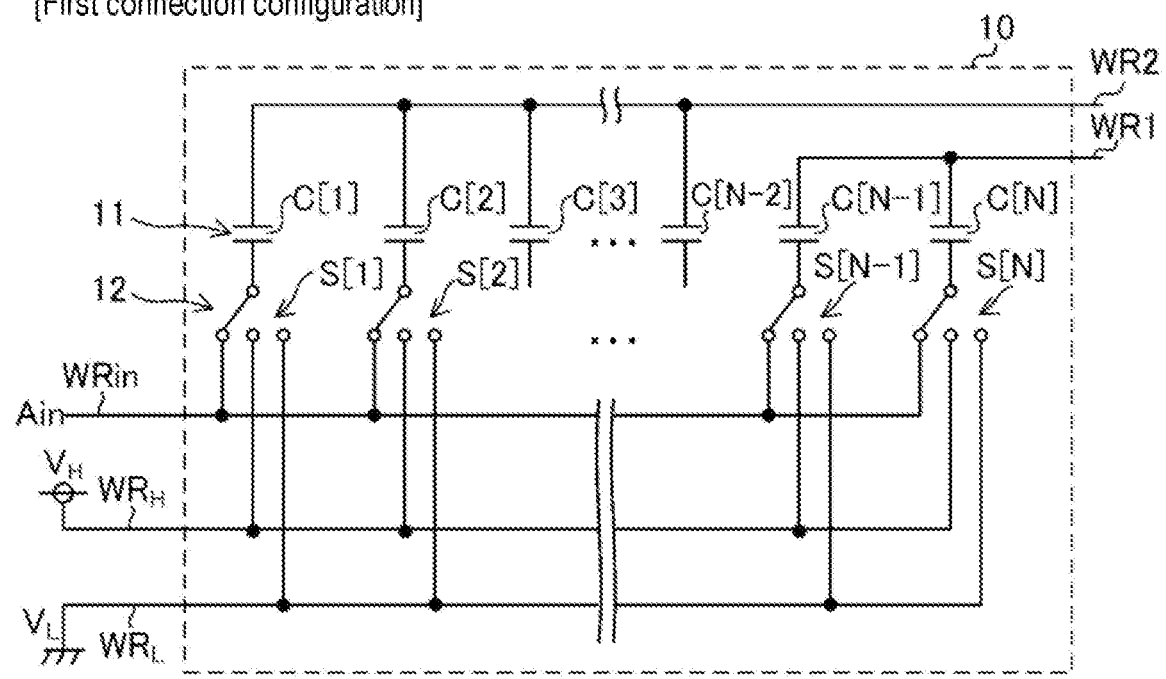
FIG. 7 is a diagram showing a first connection configuration of a DAC and two signal wirings, according to an embodiment of the present disclosure.

For example, the converter 10 may have a first connection configuration shown in FIG. 7. In the first connection configuration, the capacitors C[N-1] and C[N] belong to the first type capacitor, and the capacitors C[1] to C[N-2] belong to the second type capacitor. Alternatively, for example, the converter 10 may have a second connection configuration shown in FIG. 8. In the second connection configuration, the capacitor C[N] belongs to the first type capacitor, and the capacitors C[1] to C[N-1] belong to the second type capacitor. Alternatively, for example, the converter 10 may have a third connection configuration shown in FIG. 9. In the third connection configuration, the capacitors C[N-1] and C[N] belong to the second type capacitor, and the capacitors C[1] to C[N-2] belong to the first type capacitor. Alternatively, for example, the converter 10 may have a fourth connection configuration shown in FIG. 10. In the fourth connection configuration, the capacitor C[N] belongs to the second type capacitor, and the capacitors C[1] to C[N-1] belong to the first type capacitor.

Figure 8:
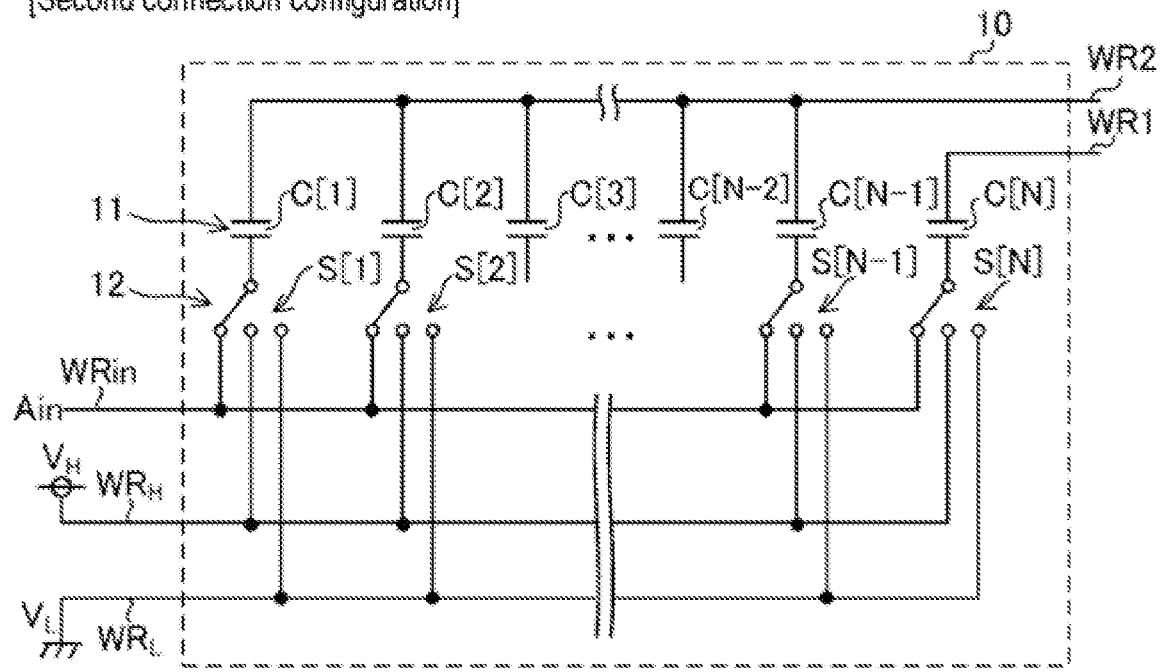
FIG. 8 is a diagram showing a second connection configuration of a DAC and two signal wirings, according to an embodiment of the present disclosure.
Figure 9:
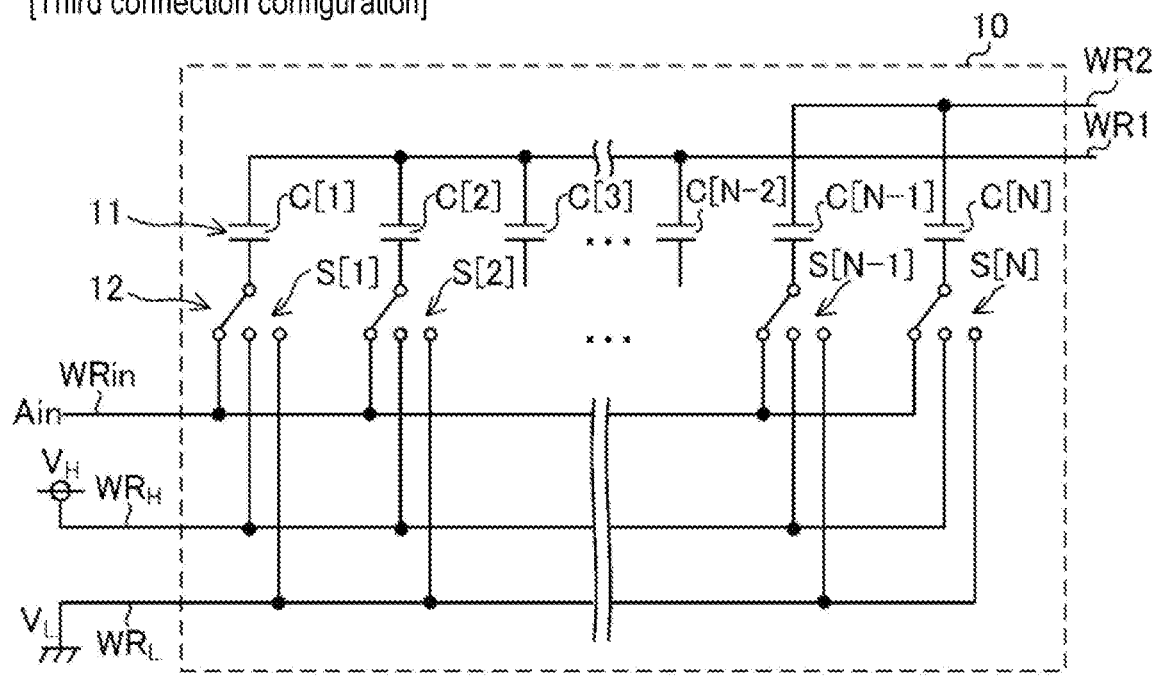
FIG. 9 is a diagram showing a third connection configuration of a DAC and two signal wirings, according to an embodiment of the present disclosure.
Figure 10:
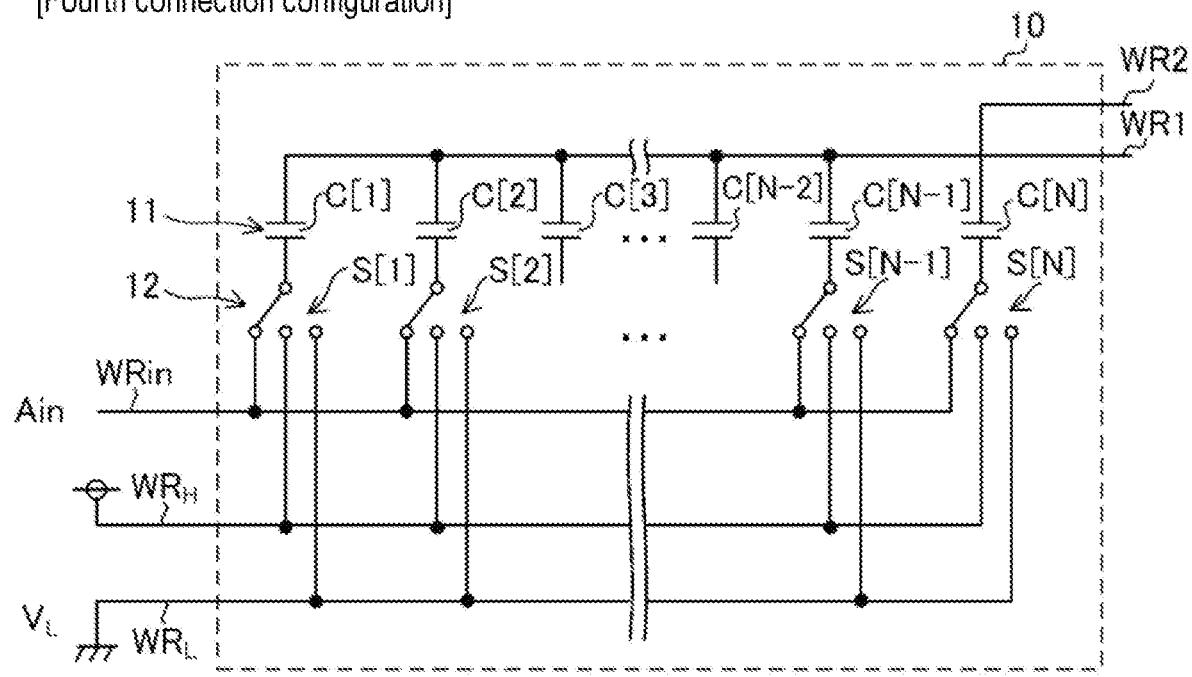
FIG. 10 is a diagram showing a fourth connection configuration of a DAC and two signal wirings, according to an embodiment of the present disclosure.

When the first connection configuration of FIG. 7 is adopted, the capacitance ratio between the capacitors $C_L$ and $C_H$ is approximately 3:1 (see also FIG. 6). Specifically, the capacitance ratio between the capacitors $C_L$ and $C_H$ refers to the ratio between the capacitance value of the capacitor $C_L$ and the capacitance value of the capacitor $C_H$. When the second connection configuration of FIG. 8 is adopted, the capacitance ratio between the capacitors $C_L$ and $C_H$ is approximately 1:1. When the third connection configuration of FIG. 9 is adopted, the capacitance ratio between the capacitors $C_L$ and $C_H$ is approximately 1:3. When the fourth connection configuration of FIG. 10 is adopted, the capacitance ratio between the capacitors $C_L$ and $C_H$ is approximately 1:1. Further, a method of classifying the capacitors C[1] to C[N] into the first type capacitor and the second type capacitor may be arbitrary.

Figure 11:
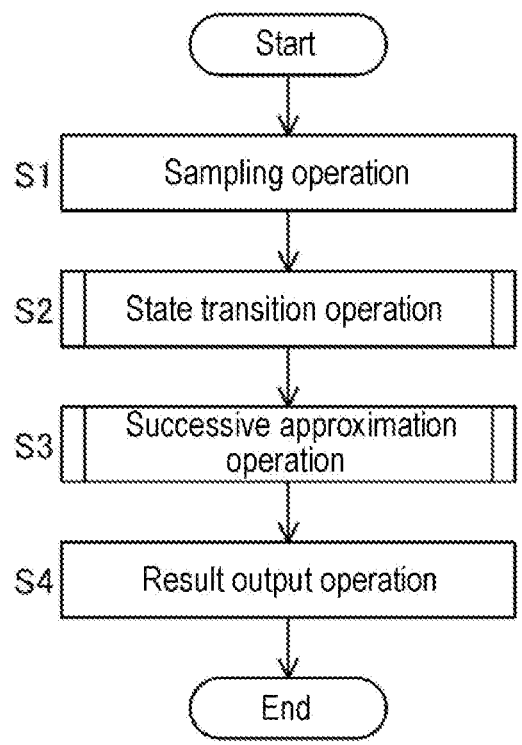
FIG. 11 is a flowchart of an A/D conversion operation, according to an embodiment of the present disclosure.

FIG. 11 shows a flowchart of an A/D conversion operation. In the A/D conversion operation, first a sampling operation is performed in step S1, a state transition operation is performed in step S2, a successive approximation operation is performed in step S3, and finally a result output operation is performed in step S4. Hereinafter, a period in which the sampling operation is performed is referred to as a sampling period, and a period in which the successive approximation operation is performed is referred to as a successive approximation period. For example, when an A/D conversion command signal is input to the A/D converter 1 from an external device (not shown), the control circuit 30 causes a transition from step S1 to step S2 and performs the operations of steps S2 to S4 sequentially.

Figure 12:
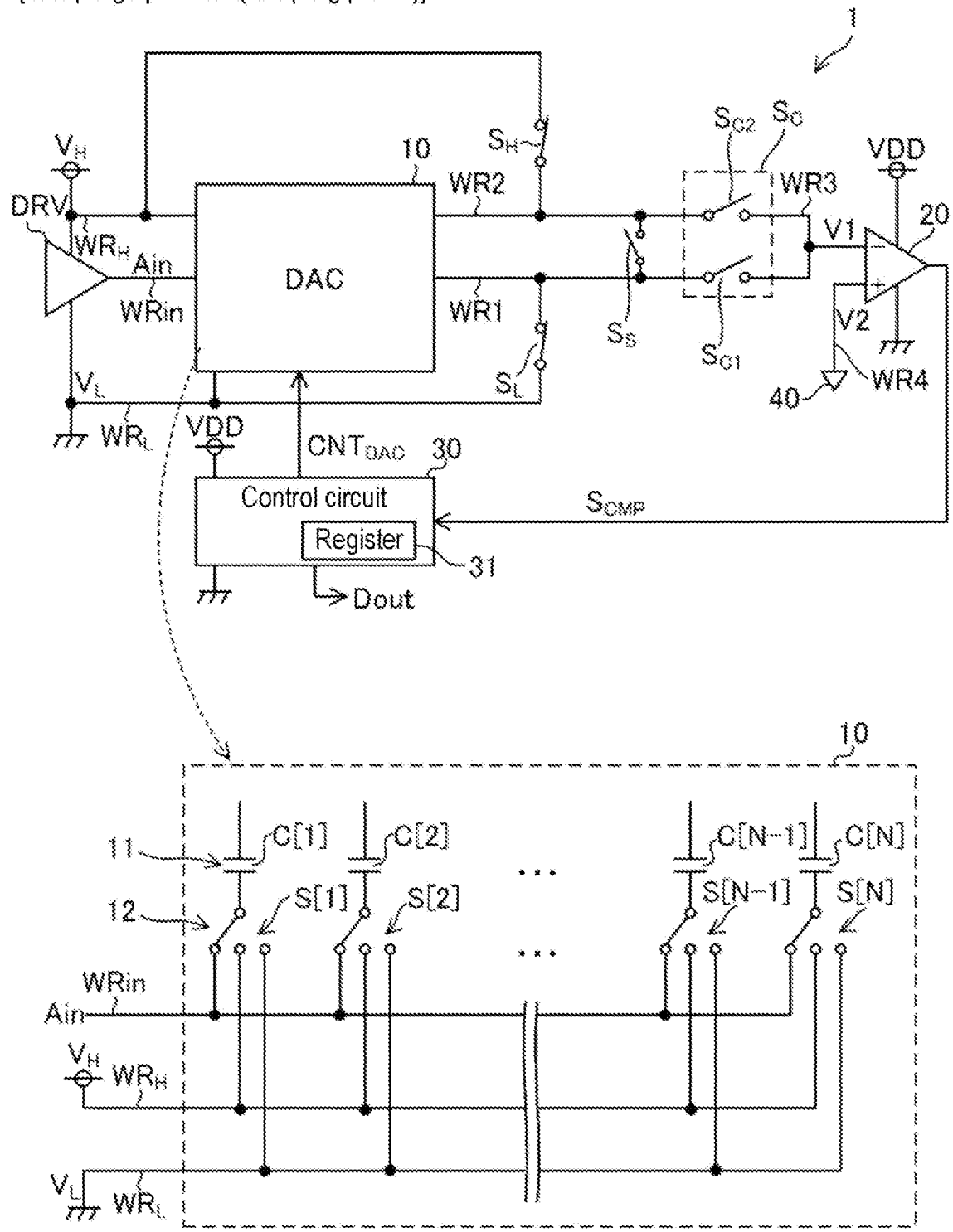
FIG. 12 is a diagram showing a state of an A/D converter when a sampling operation is performed, according to an embodiment of the present disclosure.

FIG. 12 shows a state of the A/D converter 1 during the sampling period. During the sampling period, the control circuit 30 controls all the switches S[1] to S[N] in the converter 10 to the signal input state, controls the switches $S_L$ and $S_H$ to be on, and controls the switches $S_{C1}$, $S_{C2}$, and $S_S$ to be off.

During the sampling period, the wiring WRin is connected to the capacitor array 11 via the switch array 12, so that charges corresponding to the analog input signal Ain are accumulated in each capacitor (C[1] to C[N]) in the capacitor array 11. At this time, the control circuit 30 controls the switches $S_L$ and $S_H$ to be on, thereby applying the voltage $V_L$ to the signal wiring WR1 and applying the voltage $V_H$ to the signal wiring WR2. As a result, the charges are accumulated in each capacitor in the capacitor array 11 through cooperation between the driver DRV and a DC voltage source (not shown) that generates and outputs the voltage $V_H$. The sampling period corresponds to a period for waiting execution of the A/D conversion, and the operations of the comparator 20 and the voltage generation circuit 40 are stopped during the sampling period. For this reason, the sampling period may be referred to as a power-down period.

Figure 13:
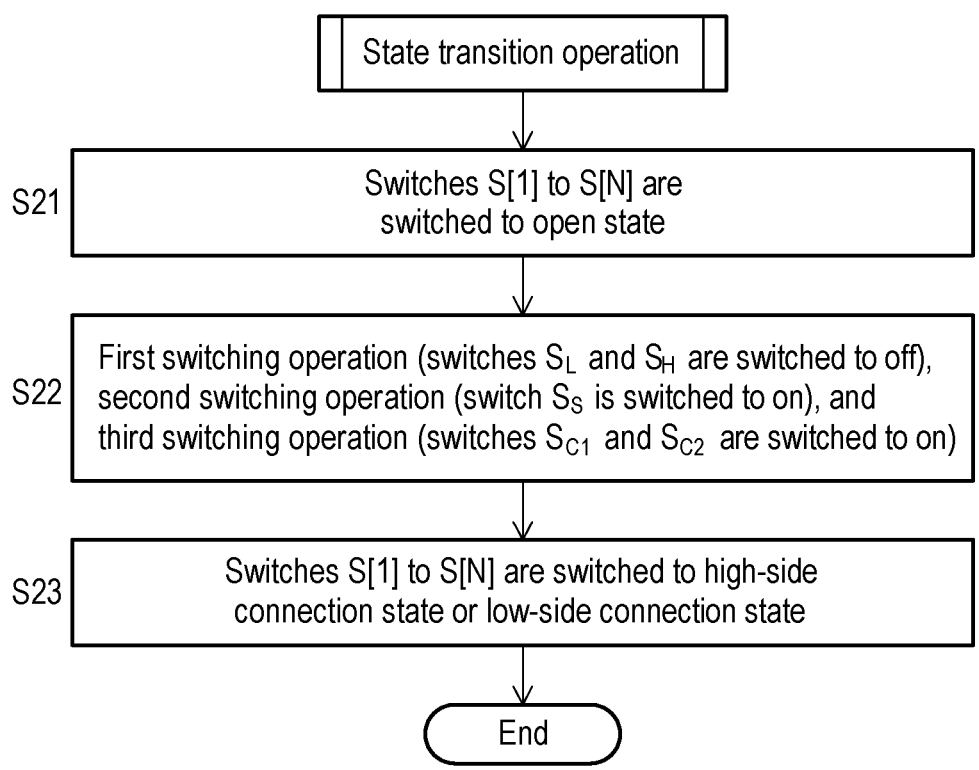
FIG. 13 is a flowchart of a state transition operation, according to an embodiment of the present disclosure.

FIG. 13 shows a flow of the state transition operation in step S2. In the example of FIG. 13, in the state transition operation, steps S21, S22, and S23 are performed in this order. However, as a modification, the operations of steps S21 and S22 may be performed simultaneously. In step S21, the states of the switches S[1] to S[N] of the converter 10 are all switched from the signal input state to the open state.

Figure 14:
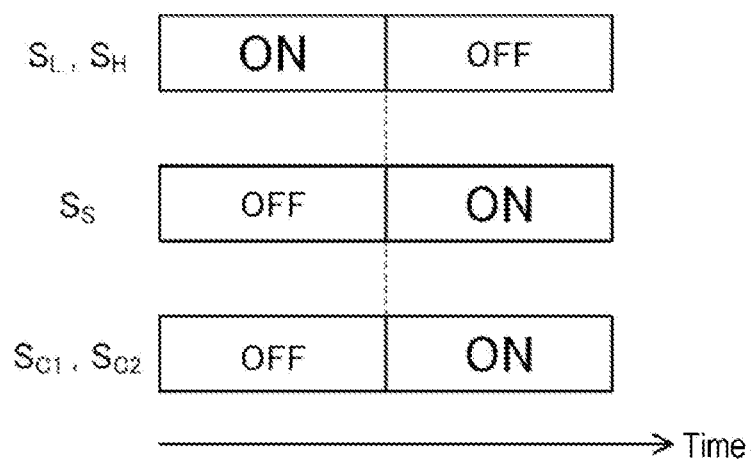
FIG. 14 is a diagram showing a state change of a switch in the state transition operation, according to an embodiment of the present disclosure.

In step S22, a first switching operation of switching the state of the switches $S_L$ and $S_H$ from on to off, a second switching operation of switching the state of the switch $S_S$ from off to on, and a third switching operation of switching the state of the switches $S_{C1}$ and $S_{C2}$ from off to on are performed. Typically, in step S22, the first, second, and third switching operations may all be performed simultaneously as shown in FIG. 14. In step S22, the first switching operation and the second switching operation may be performed simultaneously, and then the third switching operation may be performed.

That is, after the sampling period, the control circuit 30 may simultaneously switch the switch $S_S$ and the switches $S_{C1}$ and $S_{C2}$ from off to on, or may switch the switch $S_S$ from off to on and then switch the switches $S_{C1}$ and $S_{C2}$ from off to on.

After steps S21 and S22, the switches $S_L$ and $S_H$ are maintained in the off state and the switches $S_S$, $S_{C1}$, and $S_{C2}$ are maintained in the on state until the successive approximation operation of step S3 is completed. However, regarding the switch $S_S$, after the switch $S_S$ is switched to on, the switch $S_S$ may be switched to off before starting the successive approximation operation. This will be described later. In step S23, the states of the switches S[1] to S[N] of the converter 10 are switched to the high-side connection state or the low-side connection state.

Figure 15:
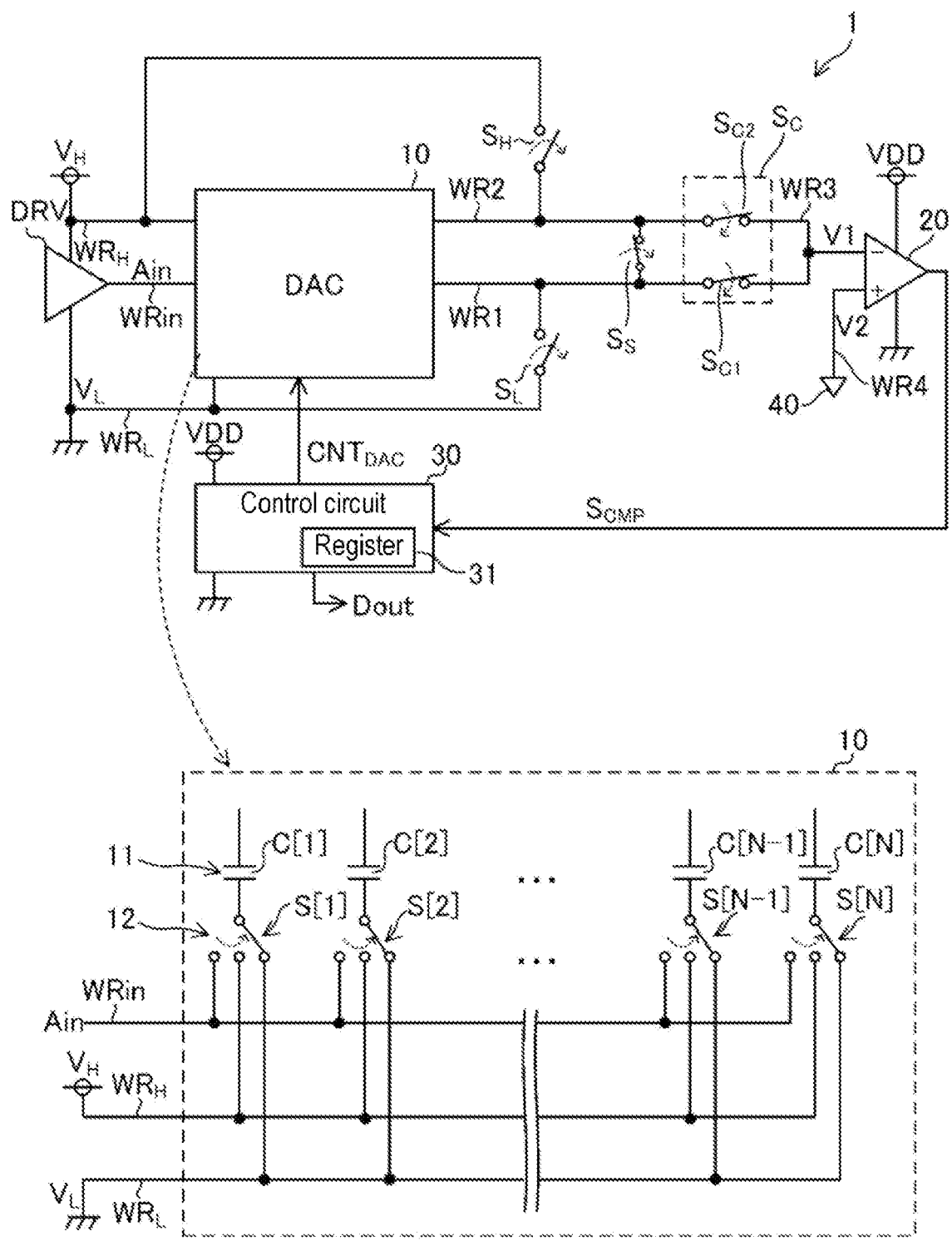
FIG. 15 is a diagram showing a state of an A/D converter related to the state transition operation, according to an embodiment of the present disclosure.

FIG. 15 shows a state of the A/D converter 1 after the operations of steps S21 to S23. In the example of FIG. 15, it is assumed that the states of the switches S[1] to S[N] of the converter 10 are all switched to the low-side connection state in step S23. Note that the operation of step S23 may be omitted.

Figure 16:
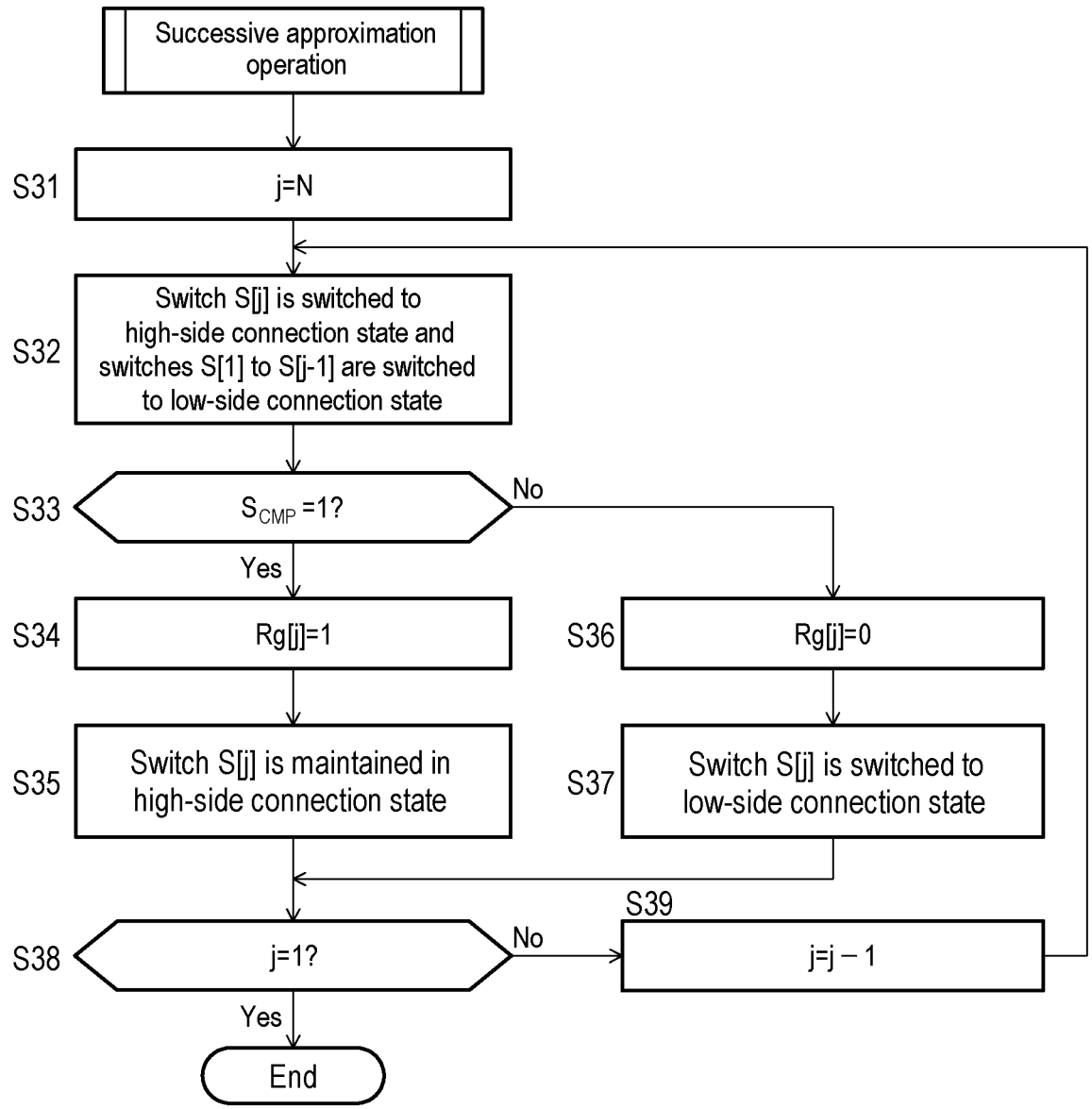
FIG. 16 is a flowchart of a successive approximation operation, according to an embodiment of the present disclosure.
Figure 17:
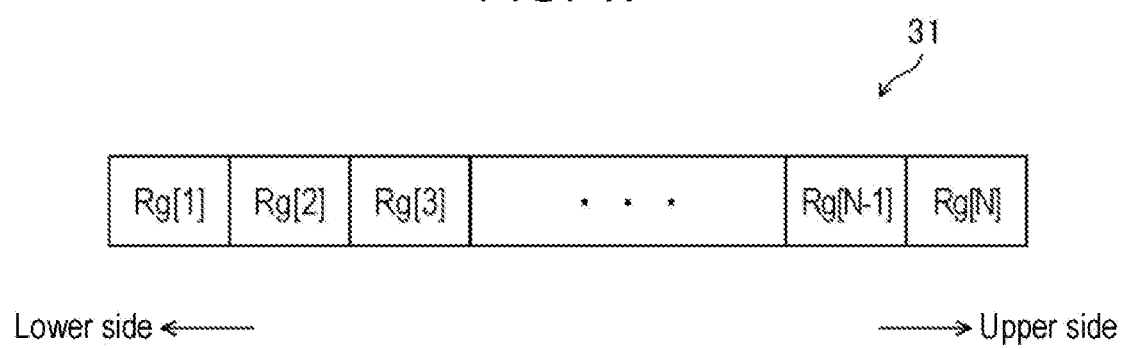
FIG. 17 is a configuration diagram of a register in a control circuit, according to an embodiment of the present disclosure.

FIG. 16 shows a flowchart of the successive approximation operation of step S3. FIG. 17 shows the structure of the register 31 (see FIG. 1). The register 31 has a storage capacity of N bits and stores values Rg[1] to Rg[N]. The values Rg[1] to Rg[N] are respectively "0" or "1." For any integer i, a value Rg[i+1] is the value of an upper bit of a value Rg[i]. In the successive approximation operation, the values Rg[1] to Rg[N] are determined bit by bit from the upper bit side, and the determined value Rg[i] becomes the value of an i-th bit in the digital output signal Dout.

In the successive approximation period, the voltage generation circuit 40 generates and outputs a predetermined comparison voltage V2. The comparison voltage V2 is set according to the voltages $V_H$ and $V_L$ and the capacitance ratio between the capacitors $C_L$ and $C_H$. Here, since it is assumed that the voltage $V_L$ is 0 V, the comparison voltage V2 is set according to the voltage $V_H$ and the capacitance ratio between the capacitors $C_L$ and $C_H$.

In the successive approximation period, the switches S[1] to S[N] are individually set to the high-side connection state or the low-side connection state. The charges accumulated in the capacitor array 11 during the sampling period are distributed to the capacitors C[1] to C[N] during the successive approximation period. The state of distribution depends on the state of the switches S[1] to S[N] during the successive approximation period, and therefore the comparison voltage V1 changes depending on the state of the switches S[1] to S[N] during the successive approximation period. In the successive approximation operation (in other words, during the successive approximation period), the control circuit 30 determines the values Rg[1] to Rg[N] (i.e., the value of the digital output signal Dout) for each bit while sequentially switching the state of the switch array 12 by binary search based on the comparison result signal $S_{CMP}$.

Figure 18:
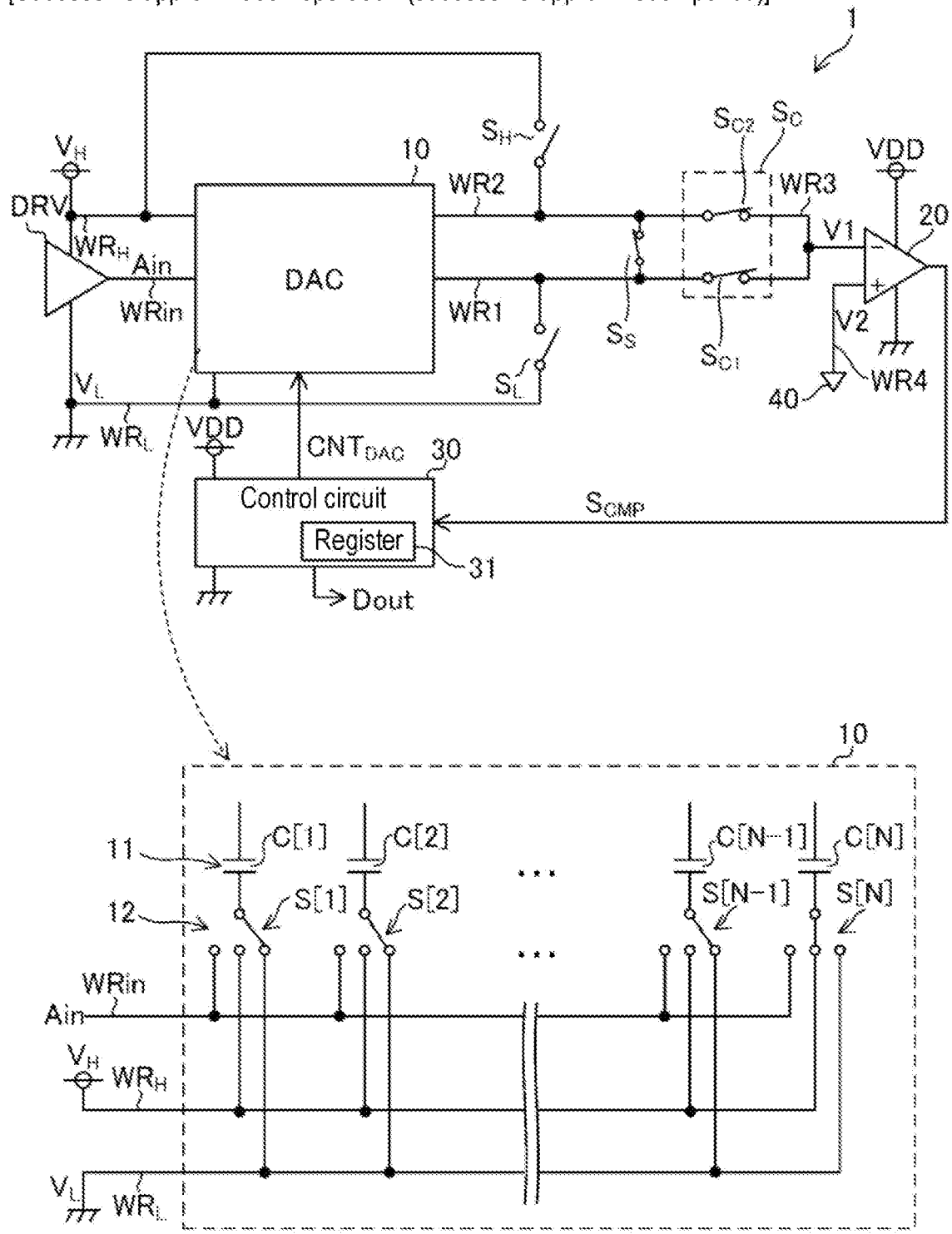
FIG. 18 is a diagram showing a state of an A/D converter when a successive approximation operation is performed, according to an embodiment of the present disclosure.

In the successive approximation operation of FIG. 16, first, in step S31, a value of N is assigned to a variable j managed by the control circuit 30. After that, the process proceeds to step S32. In step S32, the control circuit 30 controls a switch S[j] to be in the high-side connection state and controls all switches S[1] to S[j−1] to be in the low-side connection state. However, if the process of step S32 is performed in a state of "j=1," since the switches S[1] to S[j−1] do not exist, in step S32, the switch S[1] is simply controlled to be in the high-side connection state. As an example, FIG. 18 shows a state of each switch in step S32 when "j=N." As is clear from the above description, during the successive approximation period, the control circuit 30 controls the switches $S_L$ and $S_H$ to be off and controls the switches $S_{C1}$ and $S_{C2}$ to be on. By turning the switches $S_{C1}$ and $S_{C2}$ on, the signal wirings WR1 and WR2 are electrically connected to the signal wiring WR3. Although the switch $S_S$ is on in FIG. 18, the switch $S_S$ can be off during the successive approximation period.

In step S33 subsequent to step S32, the control circuit 30 acquires the value of the comparison result signal $S_{CMP}$ at the current time (that is, acquires the value of the comparison result signal $S_{CMP}$ output from the comparator 20 in the most recent state of step S32). If the acquired value is "1" (Y in step S33), the process proceeds to step S34, and the control circuit 30 performs processes of steps S34 and S35, whereas if the acquired value is "0" (N in step S33), the process proceeds to step S36, and the control circuit 30 performs processes of steps S36 and S37.

In step S34, the control circuit 30 determines a value Rg[j] to be "1." In the subsequent step S35, the control circuit 30 maintains the switch S[j] in the high-side connection state. Thereafter, the switch S[j] is maintained in the high-side connection state until the successive approximation operation of FIG. 16 is completed. After step S35, the process proceeds to step S38. Since substantially nothing is performed in step S35, step S35 may be omitted.

In step S36, the control circuit 30 determines the value Rg[j] to be "0." In the subsequent step S37, the control circuit 30 switches the state of the switch S[j] from the high-side connection state to the low-side connection state. Thereafter, the switch S[j] is maintained in the low-side connection state until the successive approximation operation of FIG. 16 is completed. After step S37, the process proceeds to step S38.

In step S38, the control circuit 30 checks whether or not the variable j is 1. If the variable j is not 1 (N in step S38), the process proceeds to step S39 where 1 is subtracted from the variable j, and then the process returns to step S32 to repeat the processes of step S32 and the subsequent steps. For example, in the second step S32, the switch S[N−1] is set to the high-side connection state, and the switches S[1] to S[N−1] are set to the low-side connection state. At this time, if "$S_{CMP}$=1" is set in the first step S33, the switch S[N] is set to the high-side connection state in the second step S32, and if "$S_{CMP}$=0" is set in the first step S33, the switch S[N] is set to the low-side connection state in the second step S32.

The processes including steps S32 to S37 are referred to as a unit comparison operation. Then, the successive approximation operation includes first to N-th unit comparison operations. The unit comparison operation performed when "j=N" is the N-th unit comparison operation, and the unit comparison operation performed when "j=N−1" is the (N−1)-th unit comparison operation, . . . , and the unit comparison operation performed when "j=1" is the first unit comparison operation. In a j-th unit comparison operation, the value Rg[j] is determined, that is, the value of the j-th bit of the digital output signal Dout is determined.

If "j=1" in step S38 (Y in step S38), the successive approximation operation of FIG. 16 is ended. At this step, all the values Rg[1] to Rg[N] have been determined.

In the result output operation of step S4 (see FIG. 11), the control circuit 30 outputs a digital signal having the values Rg[1] to Rg[N] determined in the successive approximation operation of step S3, as the digital output signal Dout. The digital output signal Dout is output to an arbitrary circuit (not shown) that utilizes the digital output signal Dout. The result output operation of step S4 may be started during the execution of the successive approximation operation of step S3. That is, as soon as the value Rg[N] is determined by the successive approximation operation, the control circuit 30 may output the value Rg[N] in the digital output signal Dout. Similarly, as soon as the value Rg[N−1] is determined by the successive approximation operation, the control circuit 30 may output the value Rg[N−1] in the digital output signal Dout. The same applies to the values Rg[N−2] to Rg[1].

When the successive approximation operation is ended or the result output operation is ended, a transition to the sampling period (in other words, the power-down period) occurs, and the control circuit 30 sets the state of each switch to the state shown in FIG. 12 (i.e., the state during the sampling period).

Figure 19:
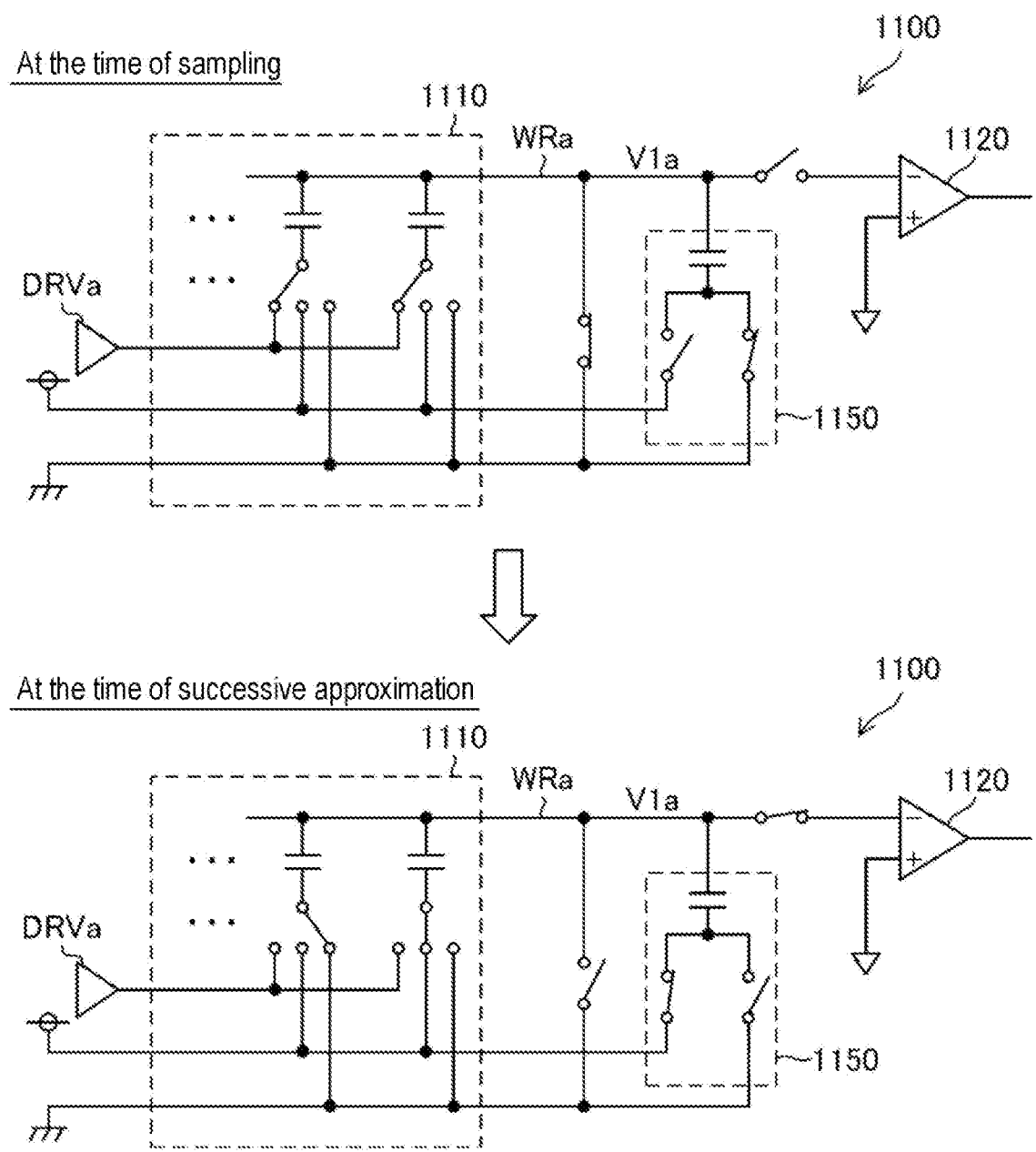
FIG. 19 is a diagram showing a partial configuration and operation outline of an A/D converter according to a first reference example.

Here, a first reference example provided for comparison with the A/D converter 1 according to the present embodiment will be described. FIG. 19 shows a partial configuration and operation outline of an A/D converter 1100 according to the first reference example. In the A/D converter 1100, one end of each capacitor in a DAC 1110 is connected in common to a wiring WRa, and sampling is performed with a voltage V1a of the wiring WRa fixed to the ground voltage. In the A/D converter 1100, when performing successive approximation, the voltage V1a is increased using a step-up circuit 1150, and the increased voltage V1a is compared with another predetermined voltage in a comparator 1120. By providing the step-up circuit 1150, there is no need to prepare a negative power supply for the comparator 1120 (without the step-up circuit 1150, since the voltage V1a can become negative during the successive approximation, the negative power supply is required).

In the first reference example of FIG. 19, the step-up circuit 1150 is essential. Further, all charges to be accumulated in each capacitor within the DAC 1110 during the sampling period are supplied by a driver (driver DRVa that supplies an analog input signal to the A/D converter 1100). Therefore, the load on the driver is large.

On the other hand, in the A/D converter 1 according to the present embodiment, during the sampling period, the charges are accumulated in each capacitor in the capacitor array 11 through cooperation between the driver DRV and a DC voltage source (not shown) that generates and outputs the voltage $V_H$. That is, charge supply is shared between the driver DRV and the DC voltage source that generates and outputs the voltage $V_H$. Therefore, the load on the driver DRV is reduced as compared to the first reference example. This leads to miniaturization or power saving of the driver DRV, or to a reduction in the gain-bandwidth (GB) product required for the driver DRV. In addition, the step-up circuit 1150 required in the first reference example is also unnecessary.

Figure 20:
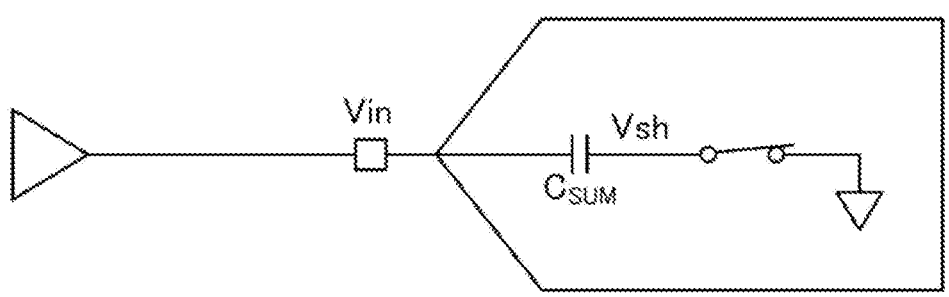
FIG. 20 is a model diagram of an A/D converter having a capacitor type DAC at the time of sampling, according to an embodiment of the present disclosure.

FIG. 20 shows a model at the time of sampling of an A/D converter having a capacitor type DAC. The total capacitance of all capacitors in the capacitor type DAC is represented by $C_{SUM}$. A voltage applied across each capacitor during sampling is expressed as "Vin–Vsh." Vin represents a voltage value of an analog input signal supplied by a driver. Therefore, in the A/D converter 1, Vin represents the voltage value of the analog input signal Ain. The amount of charges Q that the driver should supply to the capacitor type DAC during sampling is expressed as "Q=$C_{SUM}$(Vin–Vsh)," and during the sampling, the amount of charges Q is accumulated in the capacitors with the total capacitance of $C_{SUM}$.

In the A/D converter 1100 according to the first reference example, since "Vsh=0," "Q=$C_{SUM}$·Vin." In contrast, in the A/D converter 1 according to the present embodiment, since "Vsh>0," "Q<$C_{SUM}$·Vin," and therefore the load on the driver is reduced. In the A/D converter 1, the voltage Vsh is determined by the voltages $V_H$ and $V_L$ and the capacitance ratio between the capacitors $C_L$ and $C_H$. Here, since it is assumed that the voltage $V_L$ is 0 V, the voltage Vsh is determined by the voltage $V_H$ and the capacitance ratio between the capacitors $C_L$ and $C_H$. For example, when the voltage $V_H$ is 5 V and the capacitance ratio between the capacitors $C_L$ and $C_H$ is "3:1" (corresponding to the first connection configuration of FIG. 7), from "5V×1/(1+3)=1.25V," the voltage Vsh becomes 1.25 V.

Figure 21:
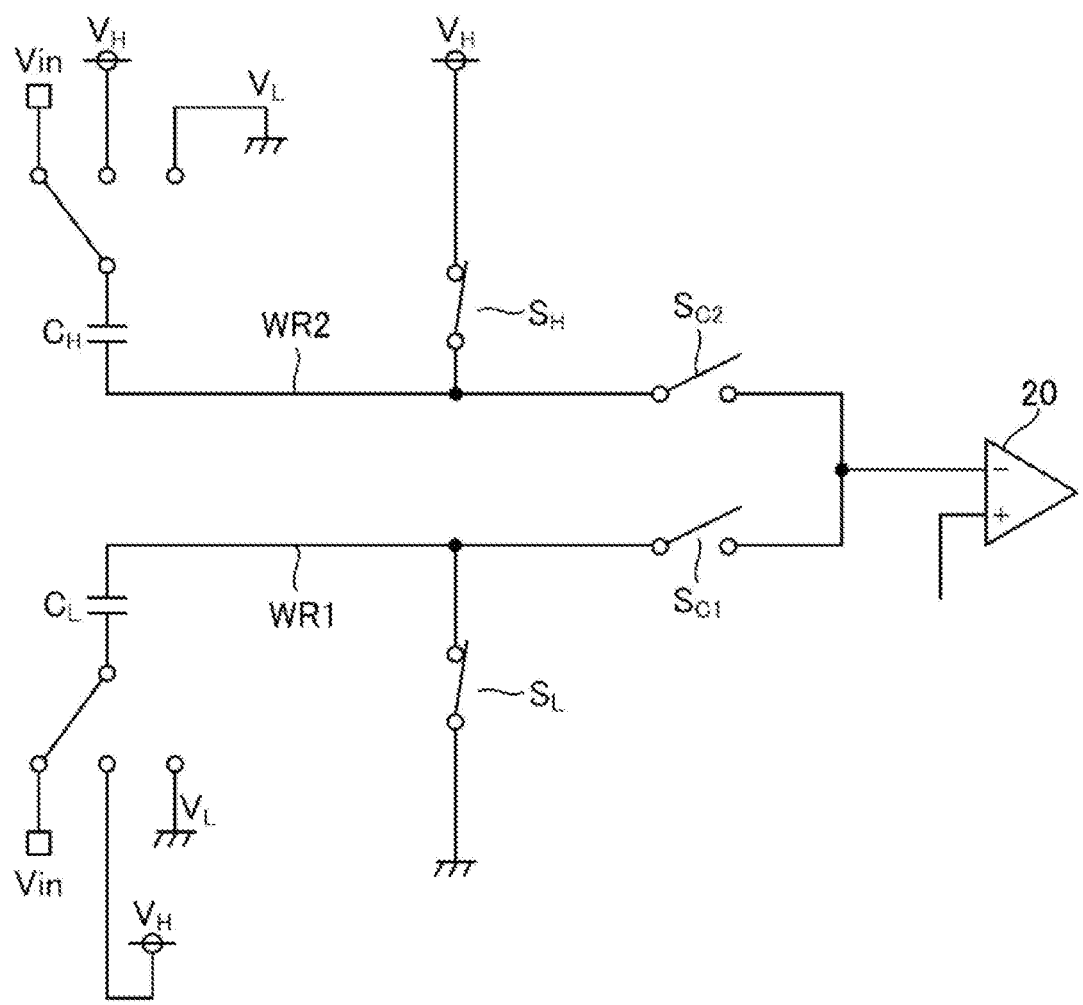
FIG. 21 is a partial equivalent circuit diagram of an A/D converter during a sampling period, according to an embodiment of the present disclosure.

FIG. 21 shows a partial equivalent circuit of the A/D converter 1 during the sampling period. In the A/D converter 1, the amount of charges Q that the driver DRV should supply to the converter 10 during sampling is expressed by Equation 1 below. During sampling, the amount of charges Q is accumulated in the combined capacitance of the capacitors $C_L$ and $C_H$. When the capacitance ratio between the capacitors $C_L$ and $C_H$ is 1:3, Equation 1 is transformed into Equation 2.

$$Q=(0-Vin)\cdot C_L+(V_H-Vin)\cdot C_H \quad \text{(Equation 1)}$$

$$Q=V_H\cdot C_H-4\cdot Vin\cdot C_H \quad \text{(Equation 2)}$$

Figure 22:
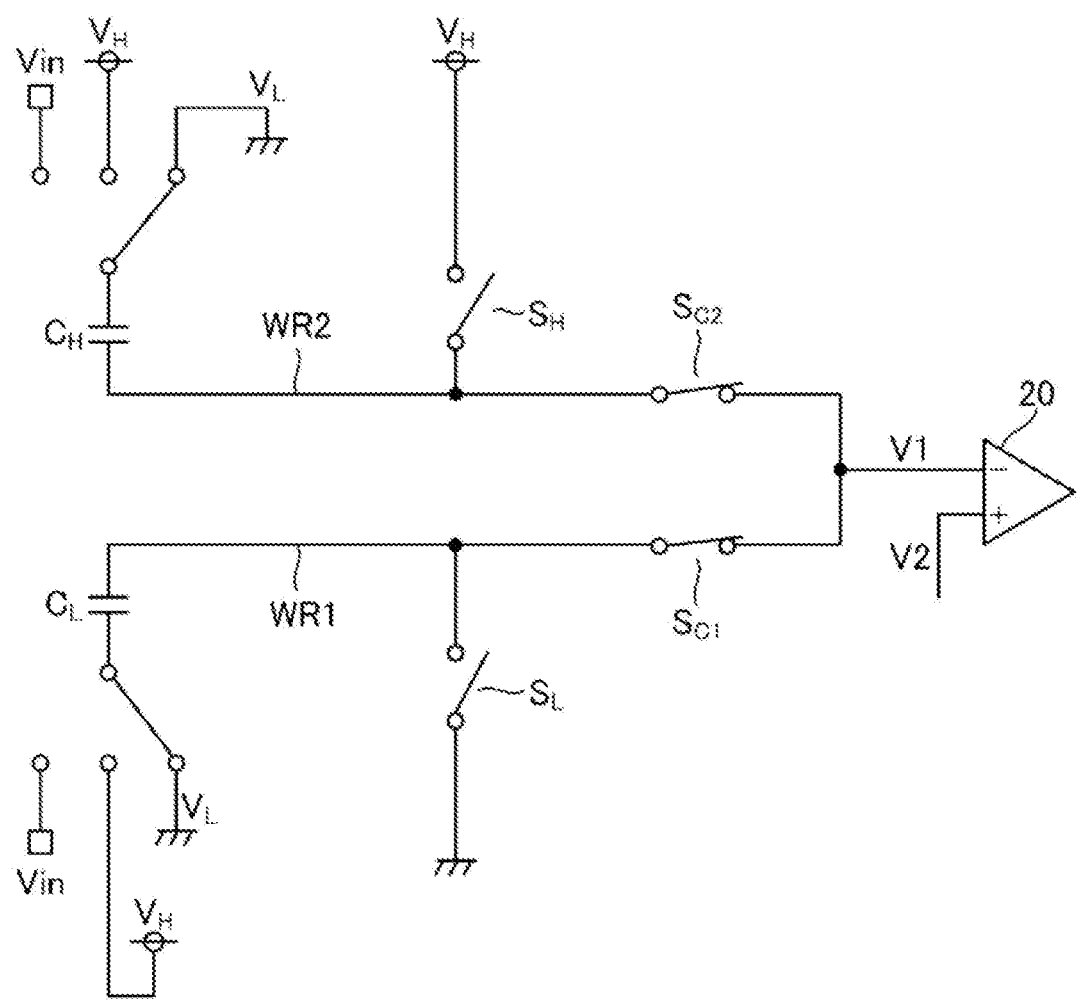
FIG. 22 is a partial equivalent circuit diagram of an A/D converter in a successive approximation period, according to an embodiment of the present disclosure.

FIG. 22 shows a partial equivalent circuit of the A/D converter 1 during the successive approximation period. However, in FIG. 22, it is assumed that all the switches in the switch array 12 are in the low-side connection state. In the state of FIG. 22, the amount of charges Q' accumulated in the combined capacitance of the capacitors $C_L$ and $C_H$ is expressed by Equation 3 below. When the capacitance ratio between the capacitors $C_L$ and $C_H$ is 3:1, the equation 3 is transformed into Equation 4.

$$Q'=(V1-0)\cdot C_L+(V1-0)\cdot C_H \quad \text{(Equation 3)}$$

$$Q'=4\cdot V1\cdot C_H \quad \text{(Equation 4)}$$

According to the law of conservation of charge, Q=Q', so if the capacitance ratio between the capacitors $C_L$ and $C_H$ is 3:1, Equation 5 is established according to Equations 2 and 4, and Equation 6 can be obtained by rearranging Equation 5. If all the capacitors are set as the first type capacitor, the right side of Equation 6 becomes "–Vin." By setting some of the capacitors as the second type capacitor, the same effect as when a step-up circuit (corresponding to the step-up circuit 1150 in FIG. 19) is provided can be obtained. A voltage $V_H$/4 in Equation 6 corresponds to a step-up amount.

$$V_H\cdot C_H-4\cdot Vin\cdot C_H=4\cdot V1\cdot C_H \quad \text{(Equation 5)}$$

$$V1=V_H/4-Vin \quad \text{(Equation 6)}$$

Note that the state in which all the switches in the switch array 12 are set to the low-side connection state in the successive approximation period corresponds to a state in which the analog input signal Ain is near the lowest level (accordingly, near the ground level) of the variation range of the analog input signal Ain. At this time, since Vin is approximately 0 V, "V1>0."

Figure 23:
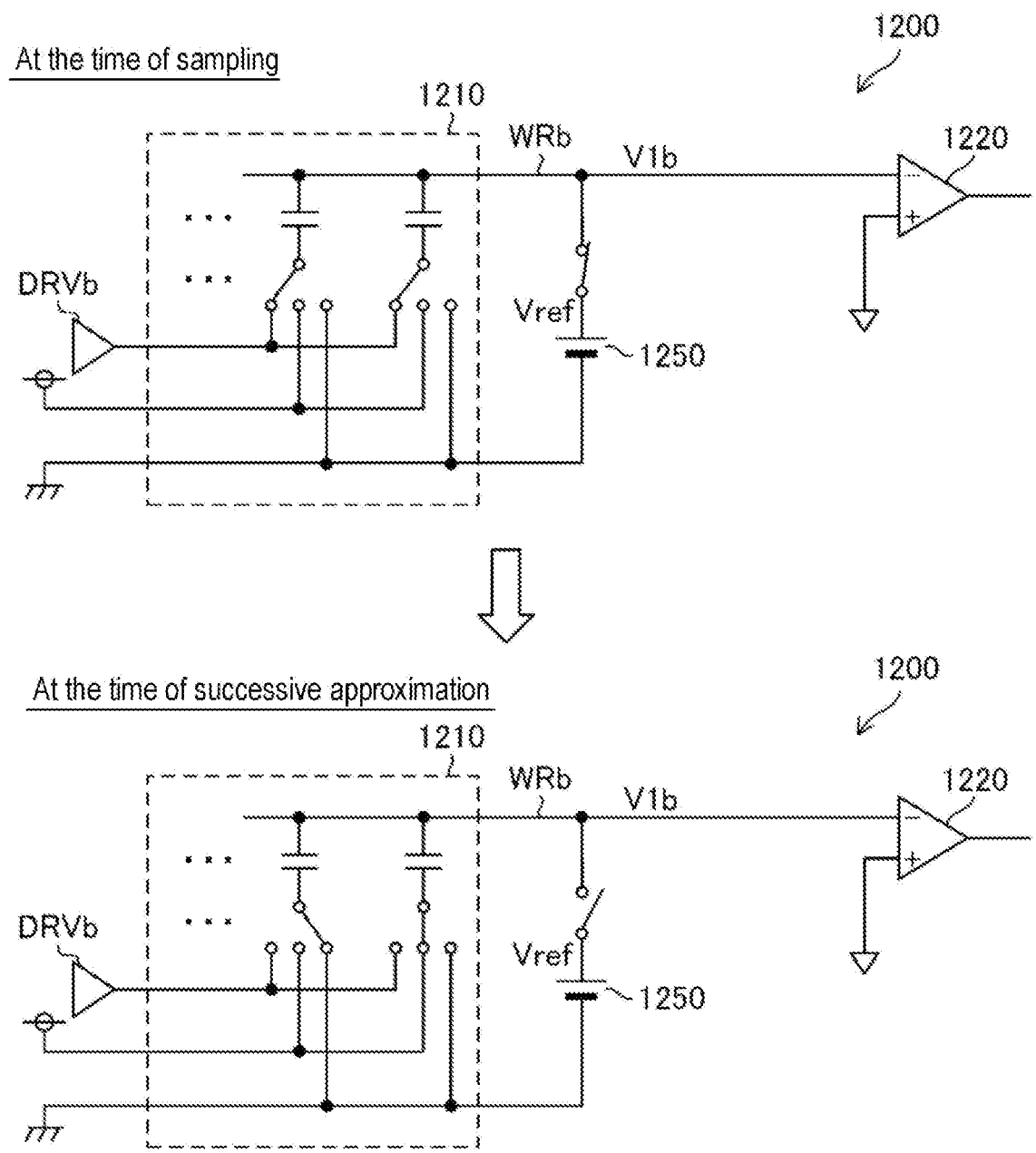
FIG. 23 is a diagram showing a partial configuration and operation outline of an A/D converter according to a second reference example.

Next, a second reference example will be described for comparison with the A/D converter 1 according to the present embodiment. FIG. 23 shows a partial configuration and operation outline of an A/D converter 1200 according to the second reference example. In the A/D converter 1200, one end of each capacitor in a DAC 1210 is connected in common to a wiring WRb, and sampling is performed with a voltage V1b of the wiring WRb fixed to a reference voltage Vref. The reference voltage Vref has a positive DC voltage value and is generated by a reference voltage source 1250. In the A/D converter 1200, when performing successive approximation, a disconnection is made between the reference voltage source 1250 and the wiring WRb, and a comparator 1220 compares the voltage V1b with another predetermined voltage. Since the voltage V1b does not become negative during the successive approximation by using the reference voltage source 1250, there is no need to provide a negative power supply for the comparator 1220.

However, in the second reference example of FIG. 23, the reference voltage source 1250 is essential, and it is necessary to constantly drive the reference voltage source 1250 even during sampling (accordingly, even during power-down). Further, all the charges to be accumulated in each capacitor in the DAC 1210 during the sampling period are supplied by a driver (driver DRVb that supplies an analog input signal to the A/D converter 1200). Therefore, the load on the driver is large.

On the other hand, in the A/D converter 1 according to the present embodiment, during the sampling period, the charges are accumulated in each capacitor in the capacitor array 11 through cooperation between the driver DRV and a DC voltage source (not shown) that generates and outputs the voltage $V_H$. That is, charge supply is shared between the driver DRV and the DC voltage source that generates and outputs the voltage $V_H$. Therefore, the load on the driver DRV is reduced as compared to the second reference example. This leads to miniaturization or power saving of the driver DRV, or to a reduction in the GB product required for the driver DRV. In addition, the reference voltage source 1250 required in the second reference example is also unnecessary in the A/D converter 1, and power consumption for constantly driving the reference voltage source does not occur.

Hereinafter, applied techniques or modified techniques related to the A/D converter 1 will be described in a plurality of examples. The matters described above regarding the A/D converter 1 are applied to each of the following examples unless otherwise stated and unless contradictory. In each example, if there are matters that contradict the above-described matters, the description in each example may take precedence. In addition, as long as there is no contradiction, the matters described in any of the following examples can be applied to any other examples (that is, it is also possible to combine any two or more of the examples).

First Example

A first example will be explained. In the A/D converter 1, during the sampling period, charges are accumulated in the capacitor $C_L$ based on the voltage $V_L$ and charges are accumulated in the capacitor $C_H$ based on the voltage $V_H$ (see FIG. 21). By averaging the voltages of the signal wirings WR1 and WR2 based on the accumulated charges in the sampling period during the state transition operation (see FIG. 13), the comparison voltage V1 to be compared with the comparison voltage V2 in the successive approximation operation is generated. Successive approximation cannot be performed correctly until the averaging is completed.

By providing the switch $S_S$, the above-mentioned averaging can be completed in a short time. By increasing the size of the switch $S_S$, the time required for the above-mentioned averaging can be shortened, and the successive approximation operation can be started immediately after sampling. After switching the switch $S_S$ from off to on in step S22 of FIG. 13, the control circuit 30 may keep the switch $S_S$ on during the successive approximation period (that is, keep the switch $S_S$ on until the successive approximation operation is completed).

Figure 24:
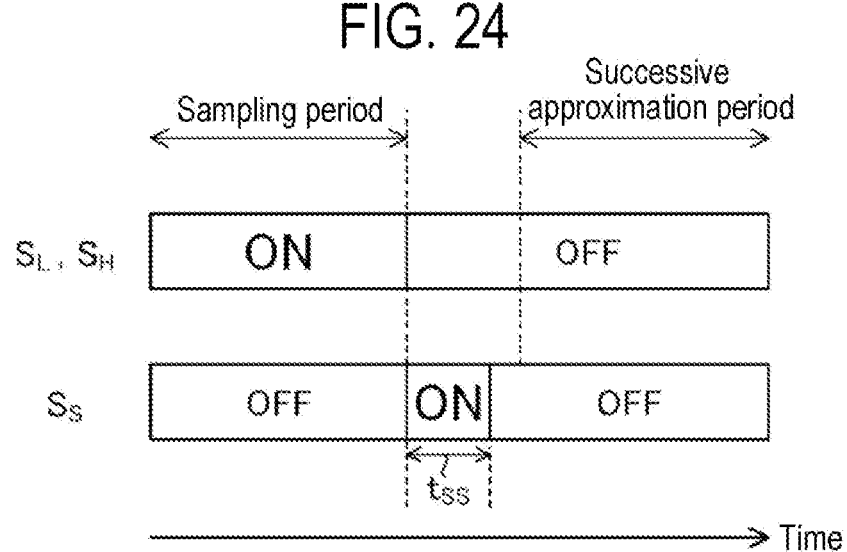
FIG. 24 is a diagram showing state changes of several switches, according to a first example belonging to the embodiment of the present disclosure.

However, the control circuit 30 may switch the switch $S_S$ from off to on in step S22, and then switch the switch $S_S$ to off before starting the successive approximation operation. In the first example, this method will be explained below. In this case, the switch $S_S$ is kept off during the successive approximation period. Specifically, referring to FIG. 24, the control circuit 30 switches the switch $S_S$ from off to on in step S22, and then switches the switch $S_S$ from on to off after a predetermined time $t_{ss}$ has elapsed. After that, the control circuit 30 starts the successive approximation operation.

The time required for the above-mentioned averaging is shortened by increasing the size of the switch $S_S$. The size of a switch refers to the size of a semiconductor switching element that constitutes the switch. However, especially when the size of the switch $S_S$ is increased, injected charges generated by switching of the switch $S_S$ can become a noise factor. That is, both the injected charges generated when switching the switch $S_S$ to on and the injected charges generated when switching the switch $S_S$ to off can give a variation (offset) to the comparison voltage V1. However, the direction of variation that the former injected charges give to the comparison voltage V1 and the direction of variation that the latter injected charges gives to the comparison voltage V1 are opposite to each other. Therefore, if the switch $S_S$ is once switched to on and then is switched to off, the influence of the injected charges is canceled.

The switching timing of the switches $S_L$ and $S_H$ from on to off and the switching timing of the switch $S_S$ from off to on may be the same, or the latter switching timing may occur a little later than the former switching timing.

Figure 25:
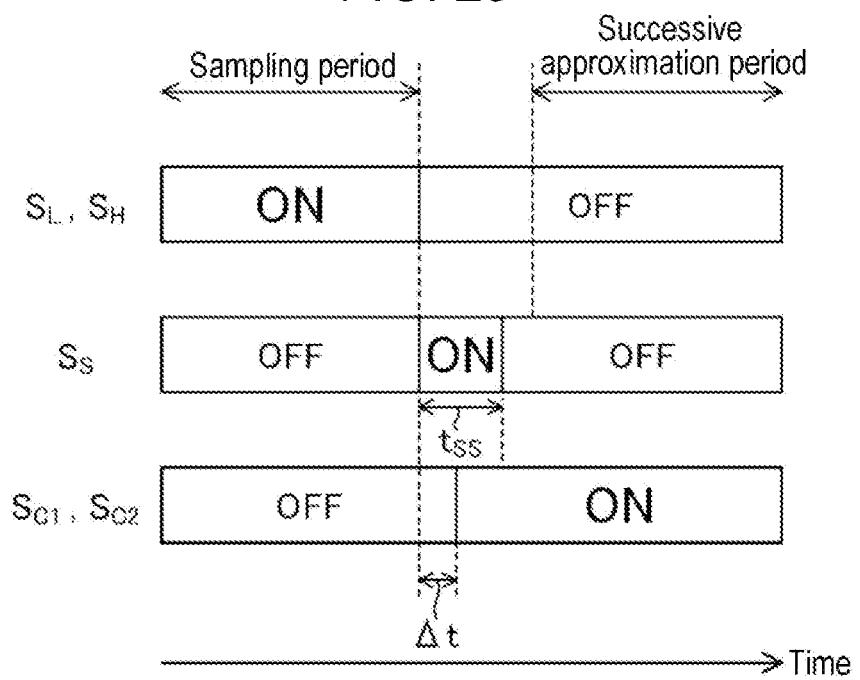
FIG. 25 is a diagram showing state changes of several switches, according to the first example belonging to the embodiment of the present disclosure.

The switching timing of the switch $S_S$ from off to on and the switching timing of the switches $S_{C1}$ and $S_{C2}$ from off to on may be the same, or as shown in FIG. 25, after switching on the switch $S_S$ from off to on, the switches $S_{C1}$ and $S_{C2}$ may be switched from off to on after a predetermined minute time Δt has elapsed.

That is, the control circuit 30 according to the first example may switch the switch $S_S$ and the switches $S_{C1}$ and $S_{C2}$ from off to on at the same time after the sampling period, or may switch the switch $S_S$ from off to on and then switch the switches $S_{C1}$ and $S_{C2}$ from off to on. In FIG. 25, "Δt<$t_{ss}$" is assumed, but "Δt=$t_{ss}$" or "Δt>$t_{ss}$" may be used. In any case, at the time when the successive approximation operation is started, the switch $S_S$ is in the off state and the switches $S_{C1}$ and $S_{C2}$ are in the on state. Note that the size of the switch $S_S$ may be larger than the size of each of the switches $S_{C1}$ and $S_{C2}$.

Second Example

A second example will be explained. FIG. 20 is referenced again along with FIG. 1. Although different from the actual situation, if "Vsh=$V_L$–0" in the configuration of FIG. 1, when "Vin=$V_H$" at the time of sampling, the driver DRV needs to supply positive charges corresponding to "Q=$C_{SUM}$(Vin−Vsh)=$C_{SUM} \cdot V_H$" to the capacitor array 11 in the converter 10. Conversely, if "Vsh=$V_H$" in the configuration of FIG. 1, when "Vin=$V_L$–0" at the time of sampling, the driver DRV needs to supply negative charges corresponding to "Q=$C_{SUM}$(Vin−Vsh)=$C_{SUM} \cdot V_H$" to the capacitor array 11 in the converter 10.

On the other hand, if "Vsh=$(V_H+V_L)/2=V_H/2$" in the configuration of FIG. 1, the maximum amount of charges that the driver DRV should supply to the capacitor array 11 during sampling is half of "$C_{SUM} \cdot V_H$." "Vsh=$(V_H+V_L)/2=V_H/2$" is established when the capacitance ratio between the capacitors $C_L$ and $C_H$ is 1. Therefore, it can be said that the closer the capacitance ratio between the capacitors $C_L$ and $C_H$ is to 1, the more effective the load reduction effect on the driver DRV becomes.

Therefore, when giving priority to the load reduction effect on the driver DRV, the capacitance ratio between the capacitors $C_L$ and $C_H$ may be set to 1 or close to 1. However, in this case, if "VDD<$V_H$," the comparison voltage V1 input to the comparator 20 during successive approximation may become inappropriately high. For example, when $(V_H, V_L)=$ (5V, 0V) and the capacitance ratio between the capacitors $C_L$ and $C_H$ is 1, the comparison voltage V1 at the time of successive approximation varies around 2.5 V depending on the voltage Vin at the time of sampling. In this case, for example, if the power supply voltage VDD is 3.0 V, since the comparison voltage V1 may exceed 3.0 V during successive approximation, the voltage comparison cannot be performed.

Figure 26:
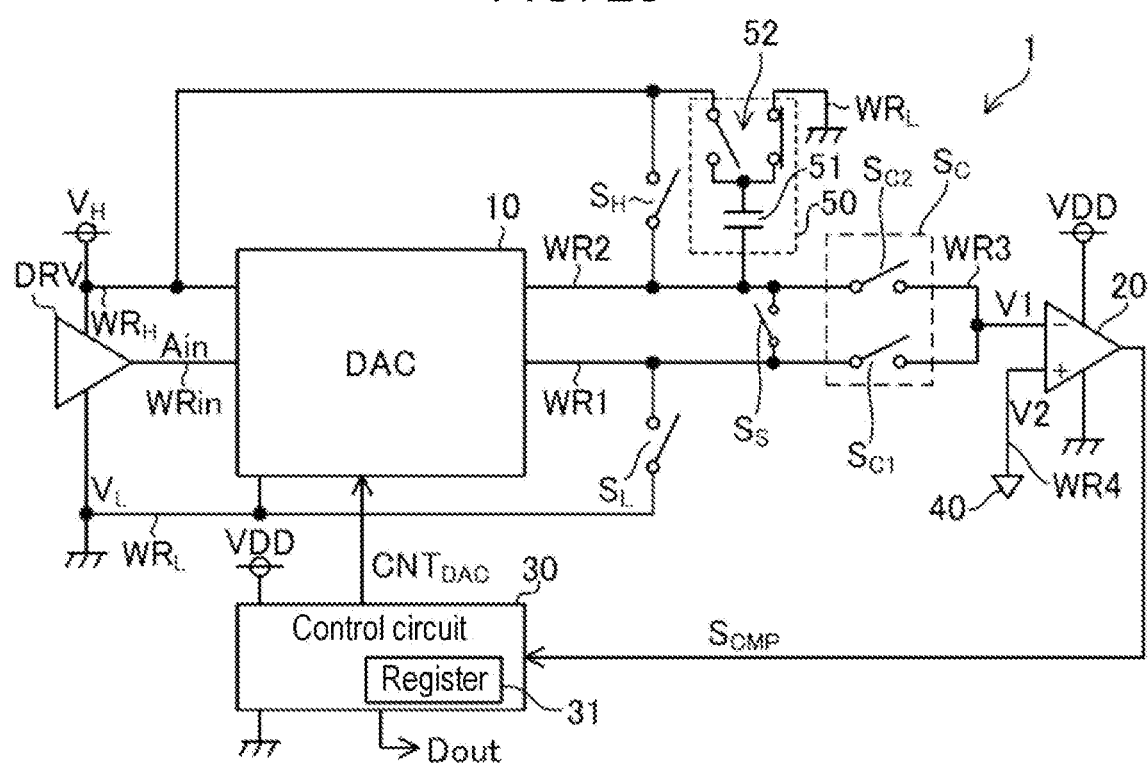
FIG. 26 is an overall configuration diagram of an A/D converter, according to a second example belonging to the embodiment of the present disclosure.

Taking this into consideration, a step-down circuit 50 is added to the A/D converter 1 according to the second example, as shown in FIG. 26. Except for the addition of the step-down circuit 50, the A/D converter 1 according to the second example has the same configuration as the A/D converter 1 described above. The step-down circuit 50 is connected to the wirings $WR_H$, $WR_L$, and WR2. The step-down circuit 50 includes a step-down capacitor 51 and a changeover switch 52. The step-down capacitor 51 has a first end and a second end. The first end of the step-down capacitor 51 is connected to the signal wiring WR2.

The changeover switch 52 is provided between the second end of the step-down capacitor 51 and the wirings $WR_H$ and $WR_L$. Specifically, the changeover switch 52 is connected to the second end of the step-down capacitor 51 and also to the wirings $WR_H$ and $WR_L$. The changeover switch 52 connects (conducts) the wiring $WR_H$ or $WR_L$ to the second end of the step-down capacitor 51 under the control of the control circuit 30. When the wiring $WR_H$ is connected to the second end of the step-down capacitor 51 through the changeover switch 52, the voltage $V_H$ is applied to the second end of the step-down capacitor 51. When the wiring $WR_L$ is connected to the second end of the step-down capacitor 51 through the changeover switch 52, the voltage $V_L$ is applied to the second end of the step-down capacitor 51. The changeover switch 52 may be a multiplexer.

FIG. 27 shows a state of the step-down circuit 50 during the sampling period and the successive approximation period. During the sampling period, the control circuit 30 connects (conducts) the wiring $WR_H$ to the second end of the step-down capacitor 51 through the changeover switch 52, thereby applying the voltage $V_H$ to the second end of the step-down capacitor 51. During the successive approximation period, the control circuit 30 connects (conducts) the wiring $WR_L$ to the second end of the step-down capacitor 51 through the changeover switch 52, thereby applying the voltage $V_L$ to the second end of the step-down capacitor 51.

A fourth switching operation of switching a connection destination of the second end of the step-down capacitor 51 from the wiring $WR_H$ to the wiring $WR_L$ is performed in step 22 of FIG. 13. The fourth switching operation may be performed simultaneously with the first switching operation. Typically, for example, the first to fourth switching operations may be performed simultaneously. However, the contents shown in the first example may also be applied to the second example.

By performing the fourth switching operation, the comparison voltage V1 in the successive approximation period is reduced as compared to a configuration in which the step-down circuit 50 is not provided. The capacitance value of the step-down capacitor 51 may be set in consideration of the power supply voltage VDD to obtain a desired amount of decrease (so that the comparator 20 can make a correct voltage comparison in the successive approximation period).

Third Example

A third example will be explained. In the third example, supplementary matters or modified techniques for the above-mentioned matters will be explained.

The switch $S_S$ may be omitted in the A/D converter 1.

Although it is assumed that the voltage $V_L$ is 0 V, the voltage $V_L$ may be other than 0 V. However, the voltage $V_L$ is lower than the voltage $V_H$.

Regarding the capacitor C[i], which is any one of the capacitors C[1] to C[N], the capacitor C[i] may be divided into two, a capacitor C[i] and a capacitor C2[i]. Then, the capacitor C[i] as the first type capacitor and the capacitor C2[i] as the second type capacitor may be incorporated into the converter 10. The combined capacitance value of the capacitors $C_1[i]$ and $C_2[i]$ is "$2^{i-1} \cdot C_{UNT}$" (see FIG. 5). Therefore, for example, each of the capacitors $C_1[i]$ and $C_2[i]$ can have a capacitance value of "$2^{i-1} \cdot C_{UNT}/2$." For all integers i that satisfy "$1 \leq i \leq N$," if the capacitors $C_1[i]$ and $C_2[i]$ each have a capacitance value of "$2^{i-1} \cdot C_{UNT}/2$," the capacitance ratio between the capacitor $C_L$ and $C_H$ is 1:1. The capacitance values of the capacitors $C_1[i]$ and $C_2[i]$ may be made different from each other so that the capacitance ratio between the capacitors $C_L$ and $C_H$ is different from 1:1.

The A/D converter 1 is a semiconductor device (electronic component) including a semiconductor chip having a semiconductor integrated circuit formed on a semiconductor substrate, a housing (package) that accommodates the semiconductor chip, and a plurality of external terminals exposed to the outside of the A/D converter 1 from the housing. The semiconductor device is formed by encapsulating the semiconductor chip in the housing (package) made of resin. Each circuit and each element provided in the A/D converter 1 may be constituted by a semiconductor integrated circuit.

The embodiments of the present disclosure can be appropriately modified in various ways within the scope of the technical ideas shown in the claims. The above-described embodiments are merely examples of the embodiments of the present disclosure, and the meanings of the terms of the present disclosure or components are not limited to those described in the above-described embodiments. The specific numerical values shown in the above description are merely examples, and it goes without saying that they can be changed to various numerical values.

Supplementary Notes

Supplementary notes will be provided for the present disclosure in which specific configuration examples are shown in the above-described embodiments.

According to one aspect of the present disclosure, a successive approximation type A/D conversion circuit 1 includes a capacitor type converter 10 and is configured to convert an analog input signal Ain into a digital output signal Dout, wherein the capacitor type converter 10 includes a capacitor array 11 including a plurality of capacitors, and a switch array 12 configured to selectively apply a first reference voltage $V_L$, a second reference voltage $V_H$ higher than the first reference voltage, or the analog input signal individually to a first end of each of the plurality of capacitors, and wherein one or more capacitors among the plurality of capacitors belong to a first type capacitor, the other capacitors among the plurality of capacitors belong to a second type capacitor, a second end of the first type capacitor is connected to a first signal wiring WR1, and a second end of the second type capacitor is connected to a second signal wiring WR2. The successive approximation type A/D conversion circuit 1 comprises a configuration (first configuration) that includes: a first reference switch $S_L$ provided between the first signal wiring and a first reference wiring $WR_L$ to which the first reference voltage is applied; a second reference switch $S_H$ provided between the second signal wiring and a second reference wiring $WR_H$ to which the second reference voltage is applied; a connection switch $S_C$ provided between a third signal wiring WR3 and each of the first signal wiring and the second signal wiring; a comparator 20; and a control circuit 30 configured to control states of the switch array 12, the first reference switch, the second reference switch, and the connection switch, wherein during a sampling period, the control circuit 30 applies the first reference voltage to the first signal wiring while applying the second reference voltage to the second signal wiring by controlling the first reference switch and the second reference switch to be on, and controls the connection switch to be off, wherein during a successive approximation period after the sampling period, the control circuit 30 electrically connects each of the first signal wiring and the second signal wiring to the third signal wiring by controlling the first reference switch and the second reference switch to be off and controlling the connection switch to be on, wherein during the successive approximation period, the comparator 20 compares a first comparison voltage V1 applied to the third signal wiring with a predetermined second comparison voltage V2 to generate a comparison result signal $S_{CMP}$, and wherein the control circuit 30 determines a value of the digital output signal based on the comparison result signal while applying the analog input signals to a plurality of first ends of the plurality of capacitors via state control of the switch array 12 during the sampling period and applying the first reference voltage or the second reference voltage individually to the plurality of first ends via state control of the switch array 12 during the successive approximation period.

As a result, the load on a circuit that supplies analog input signals to the successive approximation type A/D conversion circuit can be reduced.

The successive approximation type A/D conversion circuit of the first configuration may include a configuration (second configuration) that a short-circuit switch $S_S$ for directly short-circuiting between the first signal wiring and the second signal wiring is provided separately from the connection switch, and the control circuit controls the short-circuit switch to be off during the sampling period and controls the short-circuit switch to be on during the successive approximation period.

The first comparison voltage is generated by averaging the voltages of the first and second signal wirings based on the accumulated charges of each capacitor during the sampling period. At this time, by using the short-circuit switch, the time required for averaging can be shortened.

The successive approximation type A/D conversion circuit of the second configuration may include a configuration (third configuration) that after the sampling period, the control circuit simultaneously switches the short-circuit switch and the connection switch from off to on, or switches the short-circuit switch from off to on and then switches the connection switch from off to on.

The successive approximation type A/D conversion circuit of the first configuration may include a configuration (fourth configuration) that a short-circuit switch $S_S$ for directly short-circuiting between the first signal wiring and the second signal wiring is provided separately from the connection switch, and the control circuit controls the short-circuit switch to be off during the sampling period, controls the short-circuit switch to be on for a predetermined time $t_{ss}$ after the sampling period, and then switches the short-circuit switch from on to off before the successive approximation period.

The first comparison voltage is generated by averaging the voltages of the first and second signal wirings based on accumulated charges of each capacitor during the sampling period. At this time, by using the short-circuit switch, the time required for averaging can be shortened. Injected charges generated by switching of the short-circuit switch can become a noise factor, but as in the fourth configuration, the influence of the injected charges can be canceled by turning the short-circuit switch from off to on and then back to off before transitioning to the successive approximation period.

The successive approximation type A/D conversion circuit of the fourth configuration may include a configuration (fifth configuration) that the control circuit simultaneously switches the short-circuit switch and the connection switch from off to on, or switches the short-circuit switch from off to on and then switches the connection switch from off to on.

The successive approximation type A/D conversion circuit of any one of the first to fifth configurations may include a configuration (sixth configuration) that further includes: a step-down circuit 50 including a step-down capacitor 51 and connected to the first reference wiring and the second reference wiring, wherein a first end of the step-down capacitor is connected to the second signal wiring, and wherein the control circuit applies the second reference voltage to a second end of the step-down capacitor during the sampling period and applies the first reference voltage to the second end of the step-down capacitor during the successive approximation period.

The step-down circuit can adjust the level of the first comparison voltage in the successive approximation period to an appropriate level that matches a power supply voltage of the comparator.

The successive approximation type A/D conversion circuit of any one of the first to sixth configurations may have a configuration (seventh configuration) that the control circuit determines the value of the digital output signal bit by bit while sequentially switching a state of the switch array by binary search based on the comparison result signal in the successive approximation period.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A successive approximation type A/D conversion circuit comprising a capacitor type DAC and configured to convert an analog input signal into a digital output signal, the capacitor type DAC including:
   a capacitor array including a plurality of capacitors; and
   a switch array configured to selectively apply a first reference voltage, a second reference voltage higher than the first reference voltage, or the analog input signal individually to a first end of each of the plurality of capacitors, wherein the plurality of capacitors comprise one or more first capacitors and one or more second capacitors, wherein a second end of each first capacitor is connected to a first signal wiring, and a second end of each second capacitor is connected to a second signal wiring,
   wherein the successive approximation type A/D conversion circuit further comprises:
   a first reference switch provided between the first signal wiring and a first reference wiring to which the first reference voltage is applied;
   a second reference switch provided between the second signal wiring and a second reference wiring to which the second reference voltage is applied;
   a connection switch provided between a third signal wiring and each of the first signal wiring and the second signal wiring;
   a comparator; and
   a control circuit configured to control states of the switch array, the first reference switch, the second reference switch, and the connection switch,
   wherein during a sampling period, the control circuit applies the first reference voltage to the first signal wiring while applying the second reference voltage to the second signal wiring by controlling the first reference switch and the second reference switch to be on, and controls the connection switch to be off, wherein during a successive approximation period after the sampling period, the control circuit electrically connects each of the first signal wiring and the second signal wiring to the third signal wiring by controlling the first reference switch and the second reference switch to be off and controlling the connection switch to be on, wherein during the successive approximation period, the comparator compares a first comparison voltage applied to the third signal wiring with a predetermined second comparison voltage to generate a comparison result signal, and wherein the control circuit determines a value of the digital output signal based on the comparison result signal while applying the analog input signal to a plurality of first ends of the plurality of capacitors via state control of the switch array during the sampling period and applying the first reference voltage or the second reference voltage individually to the plurality of first ends via state control of the switch array during the successive approximation period.

2. The successive approximation type A/D conversion circuit of claim 1, wherein a short-circuit switch for directly short-circuiting between the first signal wiring and the second signal wiring is provided separately from the connection switch, and wherein the control circuit controls the short-circuit switch to be off during the sampling period and controls the short-circuit switch to be on during the successive approximation period.

3. The successive approximation type A/D conversion circuit of claim 2, wherein after the sampling period, the control circuit simultaneously switches the short-circuit switch and the connection switch from off to on, or switches the short-circuit switch from off to on and then switches the connection switch from off to on.

4. The successive approximation type A/D conversion circuit of claim 1, wherein a short-circuit switch for directly short-circuiting between the first signal wiring and the second signal wiring is provided separately from the connection switch, and wherein the control circuit controls the short-circuit switch to be off during the sampling period, controls the short-circuit switch to be on for a predetermined time after the sampling period, and then switches the short-circuit switch from on to off before the successive approximation period.

5. The successive approximation type A/D conversion circuit of claim 4, wherein the control circuit simultaneously switches the short-circuit switch and the connection switch from off to on, or switches the short-circuit switch from off to on and then switches the connection switch from off to on.

6. The successive approximation type A/D conversion circuit of claim 1, further comprising a step-down circuit including a step-down capacitor and connected to the first reference wiring and the second reference wiring, wherein a first end of the step-down capacitor is connected to the second signal wiring, and wherein the control circuit applies the second reference voltage to a second end of the step-down capacitor during the sampling period and applies the first reference voltage to the second end of the step-down capacitor during the successive approximation period.

7. The successive approximation type A/D conversion circuit of claim 1, wherein the control circuit determines the value of the digital output signal bit by bit while sequentially switching a state of the switch array by binary search based on the comparison result signal in the successive approximation period.

* * * * *